(12) United States Patent
Liao et al.

(10) Patent No.: US 9,645,354 B2
(45) Date of Patent: May 9, 2017

(54) OPTICAL IMAGE CAPTURING SYSTEM

(71) Applicant: ABILITY OPTO-ELECTRONICS TECHNOLOGY CO.LTD., Taichung (TW)

(72) Inventors: Po-Jui Liao, Taichung (TW); Hung-Wen Lee, Taichung (TW)

(73) Assignee: ABILITY OPTO-ELECTRONICS TECHNOLOGY CO. LTD., Taichung (TW)

( * ) Notice: Subject to any disclaimer, the term of this patent is extended or adjusted under 35 U.S.C. 154(b) by 0 days.

(21) Appl. No.: 14/973,168

(22) Filed: Dec. 17, 2015

(65) Prior Publication Data

US 2017/0090153 A1 Mar. 30, 2017

(30) Foreign Application Priority Data

Sep. 25, 2015 (TW) .............................. 104131902 A

(51) Int. Cl.
| G02B 13/00 | (2006.01) |
| G02B 9/06 | (2006.01) |
| G02B 7/04 | (2006.01) |
| G02B 5/20 | (2006.01) |
| G02B 27/64 | (2006.01) |
| G02B 27/00 | (2006.01) |

(52) U.S. Cl.
CPC ........... *G02B 13/003* (2013.01); *G02B 5/208* (2013.01); *G02B 7/04* (2013.01); *G02B 9/06* (2013.01); *G02B 27/0025* (2013.01); *G02B 27/646* (2013.01)

(58) Field of Classification Search
CPC .................. G02B 13/003; G02B 5/208; G02B 9/04–9/10; G02B 7/04
USPC ....................................................... 359/717
See application file for complete search history.

(56) References Cited

U.S. PATENT DOCUMENTS 7,054,074 B2 * 5/2006 Mizuno ................ G11B 7/1275
359/717

* cited by examiner

*Primary Examiner* — Joseph P Martinez
*Assistant Examiner* — Mitchell Oestreich
(74) *Attorney, Agent, or Firm* — Muncy, Geissler, Olds & Lowe, P.C.

(57) ABSTRACT

A two-piece optical lens for capturing image and a two-piece optical module for capturing image are provided. In order from an object side to an image side, the optical lens along the optical axis includes a first lens with positive refractive power; and a second lens with refractive power; and at least one of the image-side surface and object-side surface of each of the two lens elements are aspheric. The optical lens can increase aperture value and improve the imagining quality for use in compact cameras.

25 Claims, 18 Drawing Sheets

OPTICAL IMAGE CAPTURING SYSTEM

CROSS-REFERENCE TO RELATED APPLICATION

This application claims the benefit of Taiwan Patent Application No. 104131902, filed on Sep. 25, 2015, in the Taiwan Intellectual Property Office, the disclosure of which is incorporated herein in its entirety by reference.

BACKGROUND OF THE INVENTION

1. Field of the Invention

The present disclosure relates to an optical image capturing system, and more particularly to a compact optical image capturing system which can be applied to electronic products.

2. Description of the Related Art

In recent years, with the rise of portable electronic devices having camera functionalities, the demand for an optical image capturing system is raised gradually. The image sensing device of ordinary photographing camera is commonly selected from charge coupled device (CCD) or complementary metal-oxide semiconductor sensor (CMOS Sensor). In addition, as advanced semiconductor manufacturing technology enables the minimization of pixel size of the image sensing device, the development of the optical image capturing system directs towards the field of high pixels. Therefore, the requirement for high imaging quality is rapidly raised.

The traditional optical image capturing system of a portable electronic device comes with different designs, and mainly includes a second-lens design. However, the requirement for the higher pixels and the requirement for a large aperture of an end user, like functionalities of micro filming and night view have been raised. The optical image capturing system in prior arts cannot meet the requirement of the higher order camera lens module.

Therefore, how to effectively increase quantity of incoming light of the optical lenses, and further improves imaging quality for the image formation, becomes a quite important issue.

SUMMARY OF THE INVENTION

The aspect of embodiment of the present disclosure directs to an optical image capturing system and an optical image capturing lens which use combination of refractive powers, convex and concave surfaces of two optical lenses (the convex or concave surface in the disclosure denotes the change of geometrical shape of an object-side surface or an image-side surface of each lens with different height from an optical axis) to increase the quantity of incoming light of the optical image capturing system, and to improve imaging quality for image formation, so as to be applied to minimized electronic products.

The term and its definition to the lens element parameter in the embodiment of the present invention are shown as below for further reference.

The Lens Element Parameter Related to a Length or a Height in the Lens Element

A height for image formation of the optical image capturing system is denoted by HOI. A height of the optical image capturing system is denoted by HOS. A distance from the object-side surface of the first lens element to the image-side surface of the second lens element is denoted by InTL. A distance from the image-side surface of the second lens element to an image plane is denoted by InB, and InTL+InB=HOS. A distance from an aperture stop (aperture) to an image plane is denoted by InS. A distance from the first lens element to the second lens element is denoted by IN12 (instance). A central thickness of the first lens element of the optical image capturing system on the optical axis is denoted by TP1 (instance).

The Lens Element Parameter Related to a Material in the Lens Element

An Abbe number of the first lens element in the optical image capturing system is denoted by NA1 (instance). A refractive index of the first lens element is denoted by Nd1 (instance).

The Lens Element Parameter Related to a View Angle in the Lens Element

A view angle is denoted by AF. Half of the view angle is denoted by HAF. A major light angle is denoted by MRA.

The Lens Element Parameter Related to Exit/Entrance Pupil in the Lens Element

An entrance pupil diameter of the optical image capturing system is denoted by HEP. An entrance pupil diameter of the optical image capturing system is denoted by HEP. A maximum effective half diameter position of any surface of single lens element means the vertical height between the effective half diameter (EHD) and the optical axis where the incident light of the maximum view angle of the system passes through the farthest edge of the entrance pupil on the EHD of the surface of the lens element. For example, the maximum effective half diameter position of the object-side surface of the first lens element is denoted as EHD11. The maximum effective half diameter position of the image-side of the first lens element is denoted as EHD12. The maximum effective half diameter position of the object-side surface of the second lens element is denoted as EHD21. The maximum half effective half diameter position of the image-side surface of the second lens element is denoted as EHD22. The maximum effective half diameter position of any surfaces of the remaining lens elements of the optical image capturing system can be referred as mentioned above.

The Lens Element Parameter Related to an Arc Length of the Lens Element Shape and an Outline of Surface A length of outline curve of the maximum effective half diameter position of any surface of a single lens element refers to a length of outline curve from an axial point on the surface of the lens element to the maximum effective half diameter position of the surface along an outline of the surface of the lens element and is denoted as ARS. For example, the length of outline curve of the maximum effective half diameter position of the object-side surface of the first lens element is denoted as ARS11. The length of outline curve of the maximum effective half diameter position of the image-side surface of the first lens element is denoted as ARS12. The length of outline curve of the maximum effective half diameter position of the object-side surface of the second lens element is denoted as ARS21. The length of outline curve of the maximum effective half diameter position of the image-side surface of the second lens element is denoted as ARS22. The lengths of outline curve of the maximum effective half diameter position of any surface of the other lens elements in the optical image capturing system are denoted in the similar way.

A length of outline curve of a half of an entrance pupil diameter (HEP) of any surface of a signal lens element refers to a length of outline curve of the half of the entrance pupil diameter (HEP) from an axial point on the surface of the lens element to a coordinate point of vertical height with a distance of the half of the entrance pupil diameter from the optical axis on the surface along the outline of the surface of the lens element and is denoted as ARE. For example, the length of the outline curve of the half of the entrance pupil diameter (HEP) of the object-side surface of the first lens element is denoted as ARE11. The length of the outline curve of the half of the entrance pupil diameter (HEP) of the image-side surface of the first lens element is denoted as ARE12. The length of the outline curve of the half of the entrance pupil diameter (HEP) of the object-side surface of the second lens element is denoted as ARE21. The length of the outline curve of the half of the entrance pupil diameter (HEP) of the image-side surface of the second lens element is denoted as ARS22. The lengths of outline curves of the half of the entrance pupil diameters (HEP) of any surface of the other lens elements in the optical image capturing system are denoted in the similar way.

The Lens Element Parameter Related to a Depth of the Lens Element Shape

A horizontal distance in parallel with an optical axis from a maximum effective half diameter position to an axial point on the object-side surface of the second lens element is denoted by InRS11 (a depth of the maximum effective half diameter). A horizontal distance in parallel with an optical axis from a maximum effective half diameter position to an axial point on the image-side surface of the second lens element is denoted by InRS12 (the depth of the maximum effective half diameter).

The Lens Element Parameter Related to the Lens Element Shape

A critical point C is a tangent point on a surface of a specific lens element, and the tangent point is tangent to a plane perpendicular to the optical axis and the tangent point cannot be a crossover point on the optical axis. To follow the past, a distance perpendicular to the optical axis between a critical point C11 on the object-side surface of the first lens element and the optical axis is HVT11 (instance). A distance perpendicular to the optical axis between a critical point C12 on the image-side surface of the first lens element and the optical axis is HVT12 (instance). A distance perpendicular to the optical axis between a critical point C21 on the object-side surface of the second lens element and the optical axis is HVT21 (instance). A distance perpendicular to the optical axis between a critical point C22 on the image-side surface of the second lens element and the optical axis is HVT22 (instance). Distances perpendicular to the optical axis between critical points on the object-side surfaces or the image-side surfaces of other lens elements and the optical axis are denoted in the similar way described above.

The object-side surface of the second lens element has one inflection point IF211 which is nearest to the optical axis, and the sinkage value of the inflection point IF211 is denoted by SGI211. SGI211 is a horizontal shift distance in parallel with the optical axis from an axial point on the object-side surface of the second lens element to the inflection point which is nearest to the optical axis on the object-side surface of the second lens element. A distance perpendicular to the optical axis between the inflection point IF211 and the optical axis is HIF211 (instance). The image-side surface of the second lens element has one inflection point IF221 which is nearest to the optical axis and the sinkage value of the inflection point IF221 is denoted by SGI221 (instance). SGI221 is a horizontal shift distance in parallel with the optical axis from an axial point on the image-side surface of the second lens element to the inflection point which is nearest to the optical axis on the image-side surface of the second lens element. A distance perpendicular to the optical axis between the inflection point IF221 and the optical axis is HIF221 (instance).

The object-side surface of the second lens element has one inflection point IF212 which is the second nearest to the optical axis and the sinkage value of the inflection point IF212 is denoted by SGI212 (instance). SGI212 is a horizontal shift distance in parallel with the optical axis from an axial point on the object-side surface of the second lens element to the inflection point which is the second nearest to the optical axis on the object-side surface of the second lens element. A distance perpendicular to the optical axis between the inflection point IF212 and the optical axis is HIF212 (instance). The image-side surface of the second lens element has one inflection point IF222 which is the second nearest to the optical axis and the sinkage value of the inflection point IF222 is denoted by SGI222 (instance). SGI622 is a horizontal shift distance in parallel with the optical axis from an axial point on the image-side surface of the second lens element to the inflection point which is the second nearest to the optical axis on the image-side surface of the second lens element. A distance perpendicular to the optical axis between the inflection point IF222 and the optical axis is HIF222 (instance).

The object-side surface of the second lens element has one inflection point IF213 which is the third nearest to the optical axis and the sinkage value of the inflection point IF213 is denoted by SGI213 (instance). SGI213 is a horizontal shift distance in parallel with the optical axis from an axial point on the object-side surface of the second lens element to the inflection point which is the third nearest to the optical axis on the object-side surface of the second lens element. A distance perpendicular to the optical axis between the inflection point IF213 and the optical axis is HIF213 (instance). The image-side surface of the second lens element has one inflection point IF223 which is the third nearest to the optical axis and the sinkage value of the inflection point IF223 is denoted by SGI223 (instance). SGI223 is a horizontal shift distance in parallel with the optical axis from an axial point on the image-side surface of the second lens element to the inflection point which is the third nearest to the optical axis on the image-side surface of the second lens element. A distance perpendicular to the optical axis between the inflection point IF223 and the optical axis is HIF223 (instance).

The object-side surface of the second lens element has one inflection point IF214 which is the fourth nearest to the optical axis and the sinkage value of the inflection point IF214 is denoted by SGI214 (instance). SGI214 is a horizontal shift distance in parallel with the optical axis from an axial point on the object-side surface of the second lens element to the inflection point which is the fourth nearest to the optical axis on the object-side surface of the second lens element. A distance perpendicular to the optical axis between the inflection point IF214 and the optical axis is HIF214 (instance). The image-side surface of the second lens element has one inflection point IF224 which is the fourth nearest to the optical axis and the sinkage value of the inflection point IF224 is denoted by SGI224 (instance). SGI224 is a horizontal shift distance in parallel with the optical axis from an axial point on the image-side surface of the second lens element to the inflection point which is the fourth nearest to the optical axis on the image-side surface of the second lens element. A distance perpendicular to the optical axis between the inflection point IF224 and the optical axis is HIF224 (instance).

The inflection points on the object-side surfaces or the image-side surfaces of the other lens elements and the distances perpendicular to the optical axis thereof or the sinkage values thereof are denoted in the similar way described above.

The Lens Element Parameter Related to an Aberration

Optical distortion for image formation in the optical image capturing system is denoted by ODT. TV distortion for image formation in the optical image capturing system is denoted by TDT. Further, the range of the aberration offset for the view of image formation may be limited to 50%-100%. An offset of the spherical aberration is denoted by DFS. An offset of the coma aberration is denoted by DFC.

The lateral aberration of the stop is denoted as STA to assess the function of the specific optical image capturing system. The tangential fan or sagittal fan may be applied to calculate the STA of any view fields, and in particular, to calculate the STA of the max reference wavelength (e.g. 650 nm) and the minima reference wavelength (e.g. 470 nm) for serve as the standard of the optimal function. The aforementioned direction of the tangential fan can be further defined as the positive (overhead-light) and negative (lower-light) directions. The max operation wavelength, which passes through the STA, is defined as the image position of the specific view field, and the distance difference of two positions of image position of the view field between the max operation wavelength and the reference primary wavelength (e.g. wavelength of 555 nm), and the minimum operation wavelength, which passes through the STA, is defined as the image position of the specific view field, and STA of the max operation wavelength is defined as the distance between the image position of the specific view field of max operation wavelength and the image position of the specific view field of the reference primary wavelength (e.g. wavelength of 555 nm), and STA of the minimum operation wavelength is defined as the distance between the image position of the specific view field of the minimum operation wavelength and the image position of the specific view field of the reference primary wavelength (e.g. wavelength of 555 nm) are assessed the function of the specific optical image capturing system to be optimal. Both STA of the max operation wavelength and STA of the minimum operation wavelength on the image position of vertical height with a distance from the optical axis to 70% HOI (i.e. 0.7 HOI), which are smaller than 20 μm, are served as the sample. The numerical, which are smaller than 10 μm, are also served as the sample.

A maximum height for image formation on the image plane perpendicular to the optical axis in the optical image capturing system is denoted by HOI. A lateral aberration of the longest operation wavelength of a visible light of a positive direction tangential fan of the optical image capturing system passing through an edge of the entrance pupil and incident on the image plane by 0.7 HOI is denoted as PLTA. A lateral aberration of the shortest operation wavelength of a visible light of the positive direction tangential fan of the optical image capturing system passing through the edge of the entrance pupil and incident on the image plane by 0.7 HOI is denoted as PSTA. A lateral aberration of the longest operation wavelength of a visible light of a negative direction tangential fan of the optical image capturing system passing through the edge of the entrance pupil and incident on the image plane by 0.7 HOI is denoted as NLTA. A lateral aberration of the shortest operation wavelength of a visible light of a negative direction tangential fan of the optical image capturing system passing through the edge of the entrance pupil and incident on the image plane by 0.7 HOI is denoted as NSTA. A lateral aberration of the longest operation wavelength of a visible light of a sagittal fan of the optical image capturing system passing through the edge of the entrance pupil and incident on the image plane by 0.7 HOI is denoted as SLTA. A lateral aberration of the shortest operation wavelength of a visible light of the sagittal fan of the optical image capturing system passing through the edge of the entrance pupil and incident on the image plane by 0.7 HOI is denoted as SSTA.

The disclosure provides an optical image capturing system, an object-side surface or an image-side surface of the second lens element may have inflection points, such that the angle of incidence from each view field to the second lens element can be adjusted effectively and the optical distortion and the TV distortion can be corrected as well. Besides, the surfaces of the second lens element may have a better optical path adjusting ability to acquire better imaging quality.

The disclosure provides an optical image capturing system, in order from an object side to an image side including a first, second lens elements and an image plane. The first lens element has refractive power. Focal lengths of the first through second lens elements are f1 and f2 respectively. A focal length of the optical image capturing system is f. An entrance pupil diameter of the optical image capturing system is HEP. A distance on an optical axis from an object-side surface of the first lens element to the image plane is HOS. A distance on the optical axis from the object-side surface of the first lens element to the image-side surface of the second lens element is InTL. A length of outline curve from an axial point on any surface of any one of the two lens elements to a coordinate point of vertical height with a distance of a half of the entrance pupil diameter from the optical axis on the surface along an outline of the surface is denoted as ARE. The following relations are satisfied: $1.2 \leq f/HEP \leq 6.0$, $0.5 \leq HOS/f \leq 3.0$, $0 < InTL/HOS < 0.9$, and $1 \leq 2(ARE/HEP) \leq 1.5$.

The disclosure provides another optical image capturing system, in order from an object side to an image side including a first lens element, a second lens element and an image plane. The first lens element has positive refractive power and may have a convex object-side surface near the optical axis. The second lens element has refractive power and an object-side surface and an image-side surface of the second lens element are aspheric. Any of the first and second lens elements respectively has at least one inflection point on at least one surface thereof. Focal lengths of the first and second lens elements are f1 and f2 respectively. A focal length of the optical image capturing system is f. An entrance pupil diameter of the optical image capturing system is HEP. A distance on an optical axis from an object-side surface of the first lens element to the image plane is HOS. A distance on the optical axis from the object-side surface of the first lens element to the image-side surface of the second lens element is InTL A length of outline curve from an axial point on any surface of any one of the two lens elements to a coordinate point of vertical height with a distance of a half of the entrance pupil diameter from the optical axis on the surface along an outline of the surface is denoted as ARE. The following relations are satisfied: $1.2 \leq f/HEP \leq 6.0$, $0.5 \leq HOS/f \leq 3.0$, $0 < InTL/HOS < 0.9$, and $1 \leq 2(ARE/HEP) \leq 1.5$.

The disclosure provides another optical image capturing system, in order from an object side to an image side including a first lens element, a second lens element and an image plane. At least one of an object side surface and an image side surface of the second lens element has at least one inflection point on at least surface thereof. Wherein, the optical image capturing system consists of the two lens elements with refractive power. Any of the first and second lens elements respectively has at least one inflection point on at least one surface thereof. The first lens element has positive refractive power. The second lens element has positive refractive power and an object side surface and an image side surface of the second lens element are aspheric. Focal lengths of the first and the second lens elements are f1 and f2, respectively. A focal length of the optical image capturing system is f. An entrance pupil diameter of the optical image capturing system is HEP. A distance on an optical axis from an object-side surface of the first lens element to the image plane is HOS. A distance on the optical axis from the object-side surface of the first lens element to the image-side surface of the second lens element is InTL A length of outline curve from an axial point on any surface of any one of the two lens elements to a coordinate point of vertical height with a distance of a half of the entrance pupil diameter from the optical axis on the surface along an outline of the surface is denoted as ARE. The following relations are satisfied: $1.2 \leq f/HEP \leq 3.5$, $0.5 \leq HOS/f \leq 3.0$, $0 < InTL/HOS < 0.9$, and $1 \leq 2(ARE/HEP) \leq 1.5$.

The length of the outline curve of any surface of a signal lens element in the maximum effective half diameter position affects the functions of the surface aberration correction and the optical path difference in each view field. The longer outline curve may lead to a better function of aberration correction, but the difficulty of the production may become inevitable. Hence, the length of the outline curve of the maximum effective half diameter position of any surface of a signal lens element (ARS) has to be controlled, and especially, the ratio relations (ARS/TP) between the length of the outline curve of the maximum effective half diameter position of the surface (ARS) and the thickness of the lens element to which the surface belongs on the optical axis (TP) has to be controlled. For example, the length of the outline curve of the maximum effective half diameter position of the object-side surface of the first lens element is denoted as ARS11, and the thickness of the first lens element on the optical axis is TP1, and the ratio between both of them is ARS11/TP1. The length of the outline curve of the maximum effective half diameter position of the image-side surface of the first lens element is denoted as ARS12, and the ratio between ARS12 and TP1 is ARS12/TP1. The length of the outline curve of the maximum effective half diameter position of the object-side surface of the second lens element is denoted as ARS21, and the thickness of the second lens element on the optical axis is TP2, and the ratio between both of them is ARS21/TP2. The length of the outline curve of the maximum effective half diameter position of the image-side surface of the second lens element is denoted as ARS22, and the ratio between ARS22 and TP2 is ARS22/TP2. The ratio relations between the lengths of the outline curve of the maximum effective half diameter position of any surface of the other lens elements and the thicknesses of the lens elements to which the surfaces belong on the optical axis (TP) are denoted in the similar way.

The length of outline curve of half of an entrance pupil diameter of any surface of a single lens element especially affects the functions of the surface aberration correction and the optical path difference in each shared view field. The longer outline curve may lead to a better function of aberration correction, but the difficulty of the production may become inevitable. Hence, the length of outline curve of half of an entrance pupil diameter of any surface of a single lens element has to be controlled, and especially, the ratio relationship between the length of outline curve of half of an entrance pupil diameter of any surface of a single lens element and the thickness on the optical axis has to be controlled. For example, the length of outline curve of the half of the entrance pupil diameter of the object-side surface of the first lens element is denoted as ARE11, and the thickness of the first lens element on the optical axis is TP1, and the ratio thereof is ARE11/TP1. The length of outline curve of the half of the entrance pupil diameter of the image-side surface of the first lens element is denoted as ARE12, and the thickness of the first lens element on the optical axis is TP1, and the ratio thereof is ARE12/TP1. The length of outline curve of the half of the entrance pupil diameter of the object-side surface of the first lens element is denoted as ARE21, and the thickness of the second lens element on the optical axis is TP2, and the ratio thereof is ARE21/TP2. The length of outline curve of the half of the entrance pupil diameter of the image-side surface of the second lens element is denoted as ARE22, and the thickness of the second lens element on the optical axis is TP2, and the ratio thereof is ARE22/TP2. The ratio relationship of the remaining lens elements of the optical image capturing system can be referred as mentioned above.

The optical image capturing system described above may be configured to form the image on the image sensing device which is shorter than 1/1.2 inch in diagonal length. The pixel size of the image sensing device is smaller than 1.4 micrometers (μm). Preferably the pixel size thereof is smaller than 1.12 micrometers (μm). The best pixel size thereof is smaller than 0.9 micrometers (μm). Furthermore, the optical image capturing system is applicable to the image sensing device with aspect ratio of 16:9.

The optical image capturing system described above is applicable to the demand of video recording with above millions or ten millions-pixels and leads to a good imaging quality.

The height of optical system (HOS) may be reduced to achieve the minimization of the optical image capturing system when the absolute value of f1 is larger than f1 ($|f1|>f2$).

When the second lens element has the weak positive refractive power, the positive refractive power of the second lens element can be shared, such that the unnecessary aberration will not appear too early. On the contrary, when the second lens element has the weak negative refractive power, the aberration of the optical image capturing system can be corrected and fine tuned.

The second lens element may have positive refractive power and a concave image-side surface. Hereby, the back focal length is reduced for keeping the miniaturization, to miniaturize the lens element effectively. In addition, at least one of the object-side surface and the image-side surface of the second lens element may have at least one inflection point, such that the angle of incident with incoming light from an off-axis view field can be suppressed effectively and the aberration in the off-axis view field can be corrected further.

BRIEF DESCRIPTION OF THE DRAWINGS

The detailed structure, operating principle and effects of the present disclosure will now be described in more details hereinafter with reference to the accompanying drawings that show various embodiments of the present disclosure as follows.

DETAILED DESCRIPTION OF THE PREFERRED EMBODIMENTS

Figure 1A:
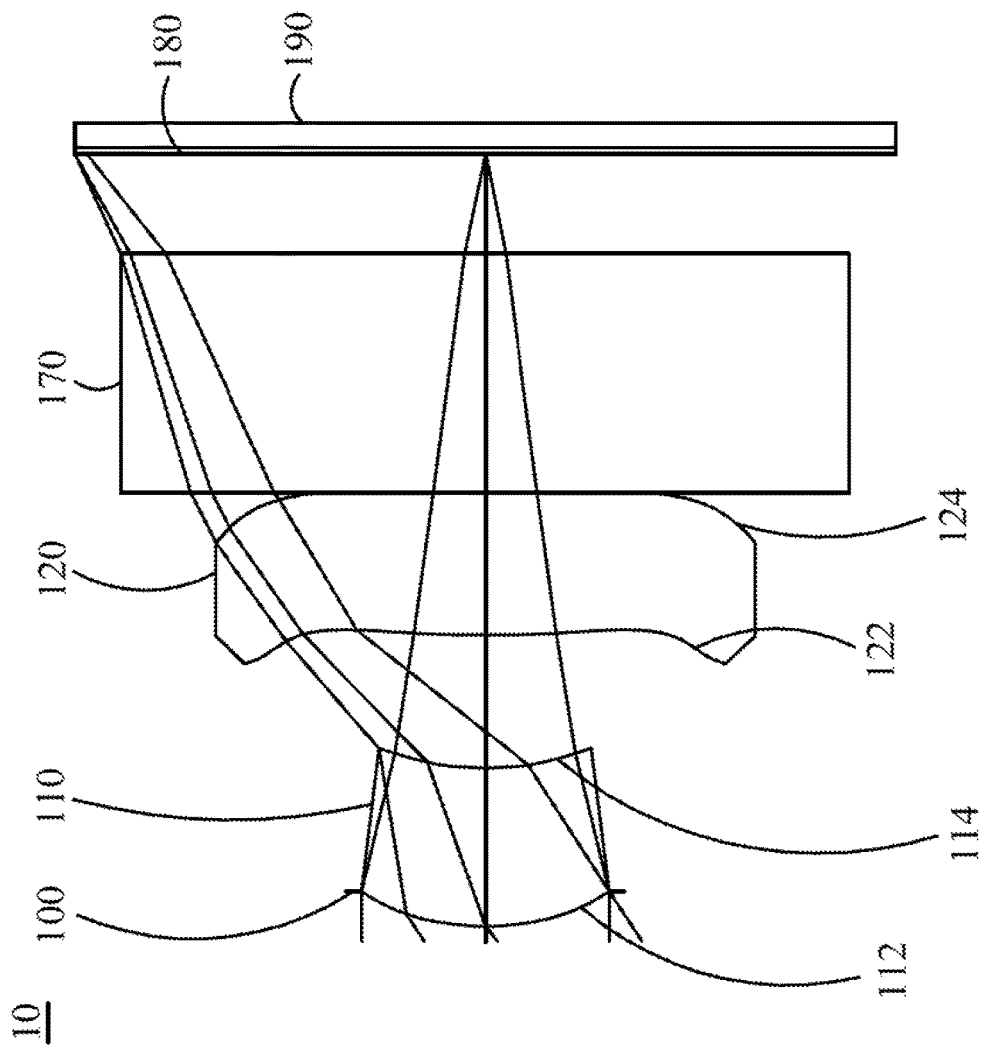
FIG. 1A is a schematic view of the optical image capturing system according to the first embodiment of the present application.

Reference will now be made in detail to the exemplary embodiments of the present disclosure, examples of which are illustrated in the accompanying drawings. Therefore, it is to be understood that the foregoing is illustrative of exemplary embodiments and is not to be construed as limited to the specific embodiments disclosed, and that modifications to the disclosed exemplary embodiments, as well as other exemplary embodiments, are intended to be included within the scope of the appended claims. These embodiments are provided so that this disclosure will be thorough and complete, and will fully convey the inventive concept to those skilled in the art. The relative proportions and ratios of elements in the drawings may be exaggerated or diminished in size for the sake of clarity and convenience in the drawings, and such arbitrary proportions are only illustrative and not limiting in any way. The same reference numbers are used in the drawings and the description to refer to the same or like parts.

It will be understood that, although the terms 'first', 'second', 'third', etc., may be used herein to describe various elements, these elements should not be limited by these terms. The terms are used only for the purpose of distinguishing one component from another component. Thus, a first element discussed below could be termed a second element without departing from the teachings of embodiments. As used herein, the term "or" includes any and all combinations of one or more of the associated listed items.

An optical image capturing system, in order from an object side to an image side, includes first and second lens elements with refractive power and an image plane. The optical image capturing system may further include an image sensing device which is disposed on an image plane.

The optical image capturing system may also use five sets of wavelengths which are 470 nm, 510 nm, 555 nm, 610 nm and 650 nm, respectively, wherein 555 nm is served as the primary reference wavelength and a reference wavelength for retrieving technical features. Regarding retrieving the lateral aberration numerals of the longest operation wavelength and the shortest operation wavelength passing through an edge of the aperture, 650 nm is served as the longest operation wavelength, 555 nm is served as the primary reference wavelength, and 470 nm is served as the longest operation wavelength.

A ratio of the focal length f of the optical image capturing system to a focal length fp of each of lens elements with positive refractive power is PPR. A ratio of the focal length f of the optical image capturing system to a focal length fn of each of lens elements with negative refractive power is NPR. A sum of the PPR of all lens elements with positive refractive power is ΣPPR. A sum of the NPR of all lens elements with negative refractive powers is ΣNPR. It is beneficial to control the total refractive power and the total length of the optical image capturing system when following conditions are satisfied: $0.5 \leq \Sigma PPR/|\Sigma NPR| \leq 4.5$. Preferably, the following relation may be satisfied: $1 \leq \Sigma PPR/|\Sigma NPR| \leq 3.8$.

The height of the optical image capturing system is HOS. It will facilitate the manufacturing of miniaturized optical image capturing system which may form images with ultra high pixels when the specific ratio value of HOS/f tends to 1.

A sum of a focal length fp of each lens element with positive refractive power is $\Sigma PP$. A sum of a focal length fn of each lens element with negative refractive power is $\Sigma NP$. In one embodiment of the optical image capturing system of the present disclosure, the following relations are satisfied: $0 < \Sigma PP \leq 200$ and $f1/\Sigma PP \leq 0.85$. Preferably, the following relations may be satisfied: $0 < \Sigma PP \leq 150$ and $0.01 \leq f1/\Sigma PP \leq 0.6$. Hereby, it's beneficial to control the focus ability of the optical image capturing system and allocate the positive refractive power of the optical image capturing system appropriately, so as to suppress the significant aberration generating too early. The first lens element has positive refractive power and a convex object-side surface. The first lens element may have positive refractive power, and it has a convex object-side surface. Hereby, strength of the positive refractive power of the first lens element can be fined-tuned, so as to reduce the total length of the optical image capturing system.

The optical image capturing system may further include an image sensing device which is disposed on an image plane. Half of a diagonal of an effective detection field of the image sensing device (imaging height or the maximum image height of the optical image capturing system) is HOI. A distance on the optical axis from the object-side surface of the first lens element to the image plane is HOS. The following relations are satisfied: $HOS/HOI \leq 3$ and $\leq 0.5 \, HOS/f \leq 3.0$. Preferably, the following relations may be satisfied: $1 \, HOS/HOI \leq 2.5$ and $1 \leq HOS/f \leq 2$. Hereby, the miniaturization of the optical image capturing system can be maintained effectively, so as to be carried by lightweight portable electronic devices.

In addition, in the optical image capturing system of the disclosure, according to different requirements, at least one aperture stop may be arranged for reducing stray light and improving the imaging quality.

In the optical image capturing system of the disclosure, the aperture stop may be a front or middle aperture. The front aperture is the aperture stop between a photographed object and the first lens element. The middle aperture is the aperture stop between the first lens element and the image plane. If the aperture stop is the front aperture, a longer distance between the exit pupil and the image plane of the optical image capturing system can be formed, such that more optical elements can be disposed in the optical image capturing system and the efficiency of receiving images of the image sensing device can be raised. If the aperture stop is the middle aperture, the view angle of the optical image capturing system can be expended, such that the optical image capturing system has the same advantage that is owned by wide angle cameras. A distance from the aperture stop to the image plane is InS. The following relation is satisfied: $0.5 \leq InS/HOS \leq 1.1$. Preferably, the following relation may be satisfied: $0.6 \leq InS/HOS \leq 1$. Hereby, features of maintaining the minimization for the optical image capturing system and having wide-angle are available simultaneously.

In the optical image capturing system of the disclosure, a distance from the object-side surface of the first lens element to the image-side surface of the second lens element is InTL.

A sum of central thicknesses of all lens elements with refractive power on the optical axis is $\Sigma TP$. The following relation is satisfied: $0.45 \leq \Sigma TP/InTL \leq 0.95$. Hereby, contrast ratio for the image formation in the optical image capturing system and defect-free rate for manufacturing the lens element can be given consideration simultaneously, and a proper back focal length is provided to dispose other optical components in the optical image capturing system.

A curvature radius of the object-side surface of the first lens element is R1. A curvature radius of the image-side surface of the first lens element is R2. The following relation is satisfied: $0.1 \leq |R1/R2| \leq 3.0$. Hereby, the first lens element may have proper strength of the positive refractive power, so as to avoid the longitudinal spherical aberration to increase too fast. Preferably, the following relation may be satisfied: $0.1 \leq |R1/R2| \leq 2.0$.

A curvature radius of the object-side surface of the second lens element is R3. A curvature radius of the image-side surface of the second lens element is R4. The following relation is satisfied: $-200 < (R3-R4)/(R3+R4) < 30$. Hereby, the astigmatism generated by the optical image capturing system can be corrected beneficially.

A distance between the first lens element and the second lens element on the optical axis is IN12. The following relation is satisfied: $0 < IN12/f \leq 0.30$. Preferably, the following relation may be satisfied: $0.01 \leq IN12/f \leq 0.25$. Hereby, the chromatic aberration of the lens elements can be improved, such that the performance can be increased.

Central thicknesses of the first lens element and the second lens element on the optical axis are TP1 and TP2, respectively. The following relation is satisfied: $2 \leq (TP1+IN12)/TP2 \leq 10$. Hereby, the sensitivity produced by the optical image capturing system can be controlled, and the performance can be increased.

The optical image capturing system of the disclosure satisfies the following relations: $0.1 \leq TP1/TP2 \leq 0.6$. Hereby, the reduction of the total height of optical system can be given consideration simultaneously and the ability of correcting the aberration can be improved.

In the optical image capturing system of the disclosure, a distance in parallel with an optical axis from a maximum effective diameter position to an axial point on the object-side surface of the second lens element is InRS21 (the InRS21 is positive if the horizontal displacement is toward the image-side surface, or the InRS21 is negative if the horizontal displacement is toward the object-side surface). A distance in parallel with an optical axis from a maximum effective diameter position to an axial point on the image-side surface of the second lens element is InRS22. A central thickness of the second lens element is TP2.

In the optical image capturing system of the disclosure, a distance in parallel with an optical axis from an inflection point on the object-side surface of the second lens element which is nearest to the optical axis to an axial point on the object-side surface of the second lens element is denoted by SGI211. A distance in parallel with an optical axis from an inflection point on the image-side surface of the second lens element which is nearest to the optical axis to an axial point on the image-side surface of the second lens element is denoted by SGI221.

A distance in parallel with the optical axis from the inflection point on the object-side surface of the second lens element which is the second nearest to the optical axis to an axial point on the object-side surface of the second lens element is denoted by SGI212. A distance in parallel with an optical axis from an inflection point on the image-side surface of the second lens element which is the second nearest to the optical axis to an axial point on the image-side surface of the second lens element is denoted by SGI222.

A distance perpendicular to the optical axis between the inflection point on the object-side surface of the second lens element which is nearest to the optical axis and the optical axis is denoted by HIF211. A distance perpendicular to the optical axis between an inflection point on the image-side surface of the second lens element which is nearest to the optical axis and an axial point on the image-side surface of the second lens element is denoted by HIF221.

A distance perpendicular to the optical axis between the inflection point on the object-side surface of the second lens element which is the second nearest to the optical axis and the optical axis is denoted by HIF212. A distance perpendicular to the optical axis between an axial point on the image-side surface of the second lens element and an inflection point on the image-side surface of the second lens element which is the second nearest to the optical axis is denoted by HIF222.

A distance perpendicular to the optical axis between the inflection point on the object-side surface of the second lens element which is the third nearest to the optical axis and the optical axis is denoted by HIF213. A distance perpendicular to the optical axis between an axial point on the image-side surface of the second lens element and an inflection point on the image-side surface of the second lens element which is the third nearest to the optical axis is denoted by HIF223.

A distance perpendicular to the optical axis between the inflection point on the object-side surface of the second lens element which is the fourth nearest to the optical axis and the optical axis is denoted by HIF214. A distance perpendicular to the optical axis between an axial point on the image-side surface of the second lens element and an inflection point on the image-side surface of the second lens element which is the fourth nearest to the optical axis is denoted by HIF224.

In one embodiment of the optical image capturing system of the present disclosure, the chromatic aberration of the optical image capturing system can be corrected by alternatively arranging the lens elements with large Abbe number and small Abbe number.

The above Aspheric formula is:

$$z = ch^2/[1+[1-(k+1)c^2h^2]^{0.5}] + A4h^4 + A6h^6 + A8h^8 + A10h^{10} + A12h^{12} + A14h^{14} + A16h^{16} + A18h^{18} + A20h^{20} + \ldots \quad (1),$$

where z is a position value of the position along the optical axis and at the height h which reference to the surface apex; k is the conic coefficient, c is the reciprocal of curvature radius, and A4, A6, A8, A10, A12, A14, A16, A18, and A20 are high order aspheric coefficients.

The optical image capturing system provided by the disclosure, the lens elements may be made of glass or plastic material. If plastic material is adopted to produce the lens elements, the cost of manufacturing will be lowered effectively. If lens elements are made of glass, the heat effect can be controlled and the designed space arranged for the refractive power of the optical image capturing system can be increased. Besides, the object-side surface and the image-side surface of the first and second lens elements may be aspheric, so as to obtain more control variables. Comparing with the usage of traditional lens element made by glass, the number of lens elements used can be reduced and the aberration can be eliminated. Thus, the total height of the optical image capturing system can be reduced effectively.

In addition, in the optical image capturing system provided by the disclosure, if the lens element has a convex surface, the surface of the lens element adjacent to the optical axis is convex in principle. If the lens element has a concave surface, the surface of the lens element adjacent to the optical axis is concave in principle.

Besides, in the optical image capturing system of the disclosure, according to different requirements, at least one aperture may be arranged for reducing stray light and improving the imaging quality.

In the optical image capturing system of the disclosure, the aperture stop may be a front or middle aperture. The front aperture is the aperture stop between a photographed object and the first lens element. The middle aperture is the aperture stop between the first lens element and the image plane. If the aperture stop is the front aperture, a longer distance between the exit pupil and the image plane of the optical image capturing system can be formed, such that more optical elements can be disposed in the optical image capturing system and the effect of receiving images of the image sensing device can be raised. If the aperture stop is the middle aperture, the view angle of the optical image capturing system can be expended, such that the optical image capturing system has the same advantage that is owned by wide angle cameras.

The optical image capturing system of the disclosure can be adapted to the optical image capturing system with automatic focus if required. With the features of a good aberration correction and a high quality of image formation, the optical image capturing system can be used in various application fields.

The optical image capturing system of the disclosure can include a driving module according to the actual requirements. The driving module may be coupled with the lens elements to enable the lens elements producing displacement. The driving module may be the voice coil motor (VCM) which is applied to move the lens to focus, or may be the optical image stabilization (OIS) which is applied to reduce the distortion frequency owing to the vibration of the lens while shooting.

At least one of the first and second lens elements of the optical image capturing system of the disclosure may further be designed as a light filtration element with a wavelength of less than 500 nm according to the actual requirement. The light filter element may be made by coating at least one surface of the specific lens element characterized of the filter function, and alternatively, may be made by the lens element per se made of the material which is capable of filtering short wavelength.

According to the above embodiments, the specific embodiments with figures are presented in detail as below.

The First Embodiment (Embodiment 1)

Figure 1B:
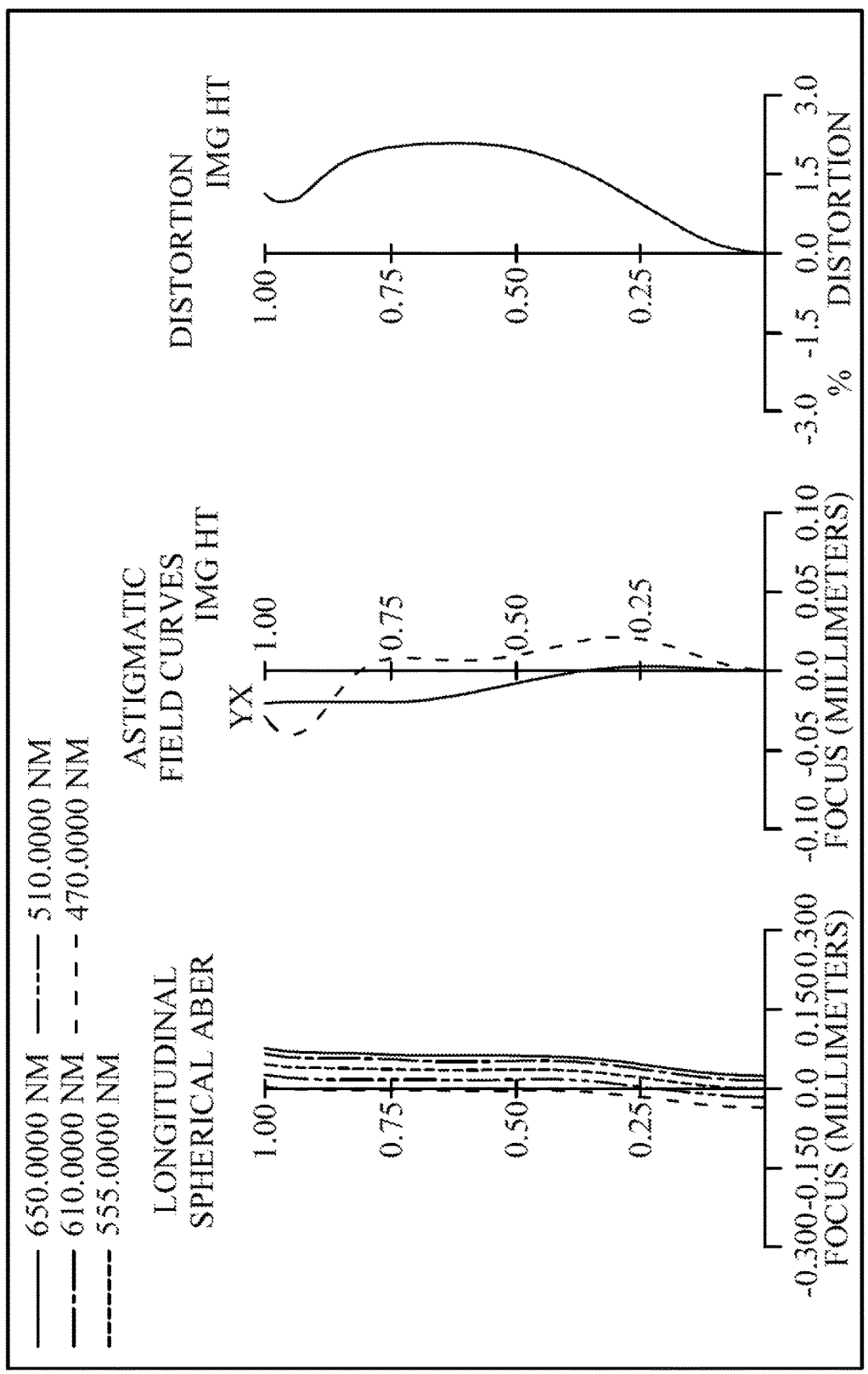
FIG. 1B is longitudinal spherical aberration curves, astigmatic field curves, and an optical distortion grid of the optical image capturing system in the order from left to right according to the first embodiment of the present application.
Figure 1C:
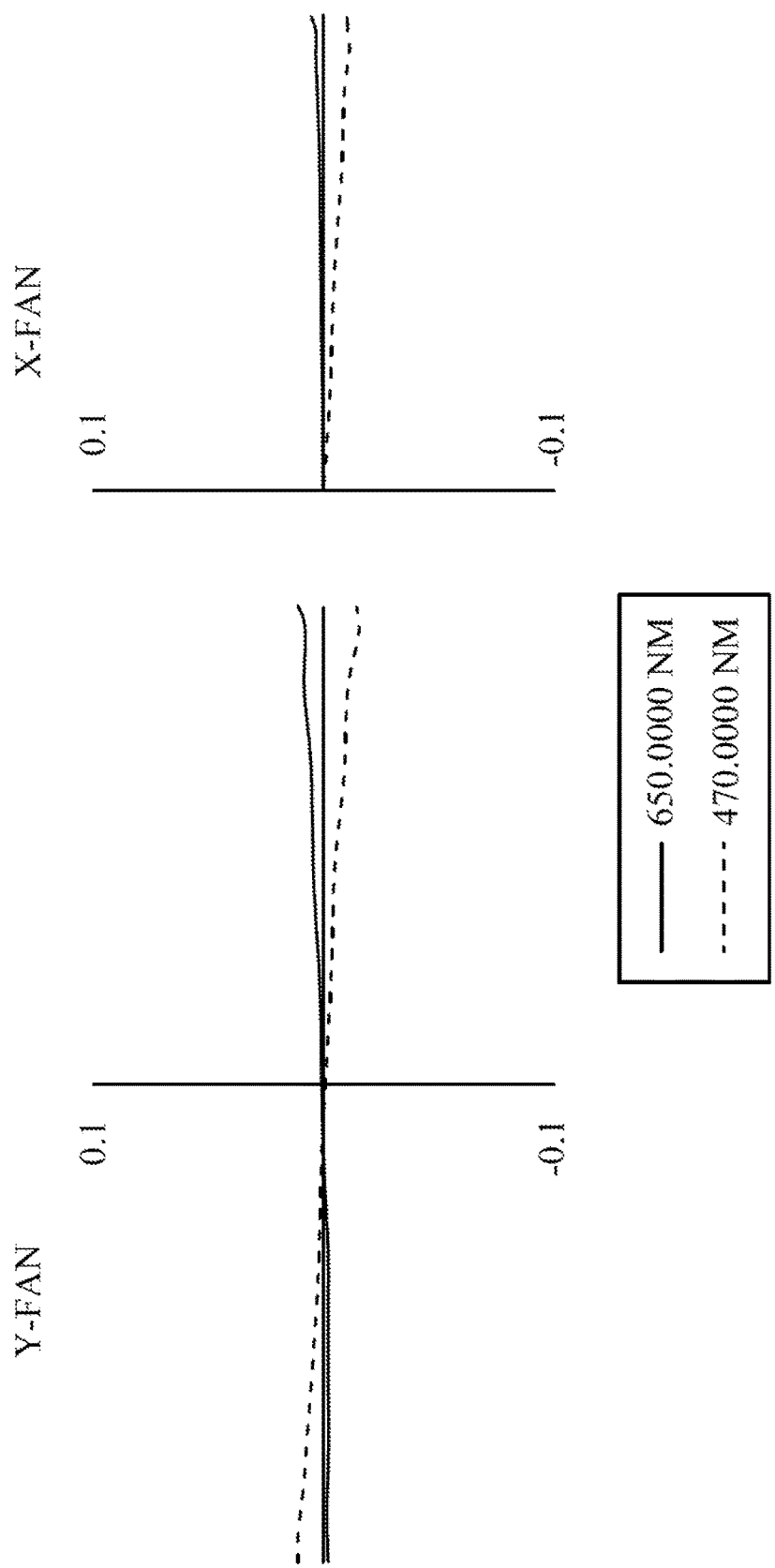
FIG. 1C is a lateral aberration diagram of tangential fan, sagittal fan, the longest operation wavelength and the shortest operation wavelength passing through an edge of the entrance pupil and incident on the image plane by 0.7 HOI according to the first embodiment of the present application.

Please refer to FIG. 1A and FIG. 1B. FIG. 1A is a schematic view of the optical image capturing system according to the first embodiment of the present application, FIG. 1B is longitudinal spherical aberration curves, astigmatic field curves, and an optical distortion curve of the optical image capturing system in the order from left to right according to the first embodiment of the present application, and FIG. 1C is a lateral aberration diagram of tangential fan, sagittal fan, the longest operation wavelength and the shortest operation wavelength passing through an edge of the entrance pupil and incident on the image plane by 0.7 HOI according to the first embodiment of the present application. As shown in FIG. 1A, in order from an object side to an image side, the optical image capturing system includes an aperture stop 100, a first lens element 110, a second lens element 120, an IR-bandstop filter 170, an image plane 180, and an image sensing device 190.

The first lens element 110 has positive refractive power and it is made of plastic material. The first lens element 110 has a convex object-side surface 112 and a concave image-side surface 114, and both of the object-side surface 112 and the image-side surface 114 are aspheric. A distance in parallel with an optical axis from an inflection point on the object-side surface of the first lens element which is nearest to the optical axis to an axial point on the object-side surface of the first lens element is denoted by SGI111. A distance in parallel with an optical axis from an inflection point on the image-side surface of the first lens element which is nearest to the optical axis to an axial point on the image-side surface of the first lens element is denoted by SGI121. The length of outline curve of the maximum effective half diameter position of the object-side surface of the first lens element is denoted as ARS11. The length of outline curve of the maximum effective half diameter position of the image-side surface of the first lens element is denoted as ARS12. The length of outline curve of a half of an entrance pupil diameter (HEP) of the object-side surface of the first lens element is denoted as ARE11, and the length of outline curve of the half of the entrance pupil diameter (HEP) of the image-side surface of the first lens element is denoted as ARE12. The thickness of the first lens element on the optical axis is TP1.

The second lens element 120 has positive refractive power and it is made of plastic material. The second lens element 120 has a convex object-side surface 122 and a concave image-side surface 124, and both of the object-side surface 122 and the image-side surface 124 are aspheric and both have an inflection point. A distance in parallel with an optical axis from an inflection point on the object-side surface of the second lens element which is nearest to the optical axis to an axial point on the object-side surface of the second lens element is denoted by SGI211. A distance in parallel with an optical axis from an inflection point on the image-side surface of the second lens element which is nearest to the optical axis to an axial point on the image-side surface of the second lens element is denoted by SGI221. The following relations are satisfied: SGI211=0.0082 mm, SGI221=0.0017 mm, |SGI211|/(|SGI211|+TP2)=0.02 and |SGI221|/(|SGI221|+TP2)=0.002. The length of outline curve of the maximum effective half diameter position of the object-side surface of the second lens element is denoted as ARS11, and the length of outline curve of the maximum effective half diameter position of the image-side surface of the second lens element is denoted as ARS12. The length of outline curve of a half of an entrance pupil diameter (HEP) of the object-side surface of the second lens element is denoted as ARE21, and the length of outline curve of the half of the entrance pupil diameter (HEP) of the image-side surface of the second lens element is denoted as ARE22. The thickness of the second lens element on the optical axis is TP2.

A distance perpendicular to the optical axis from the inflection point on the object-side surface of the second lens element which is nearest to the optical axis to an axial point on the object-side surface of the second lens element is denoted by HIF111. A distance perpendicular to the optical axis from the inflection point on the image-side surface of the second lens element which is nearest to the optical axis to an axial point on the image-side surface of the second lens element is denoted by HIF121. The following relations are satisfied: HIF111=0.2041 mm, HIF121=0.2073 mm, HIF111/HOI=0.2041, and HIF121/HOI=0.2073.

The IR-bandstop filter 170 is made of glass material without affecting the focal length of the optical image capturing system and it is disposed between the second lens element 120 and the image plane 180.

In the optical image capturing system of the first embodiment, a focal length of the optical image capturing system is f, an entrance pupil diameter of the optical image capturing system is HEP, and half of a maximal view angle of the optical image capturing system is HAF. The detailed parameters are shown as below: f=1.5270 mm, f/HEP=2.52, HAF=32.4537° and tan(HAF)=0. 0.6359.

In the optical image capturing system of the first embodiment, a focal length of the first lens element 110 is f1 and a focal length of the first lens element 110 is f1. The following relations are satisfied: f1=1.8861 mm, f2=4.6465 mm, |f/f1|=0.8096, |f1|<f2, and |f1/f2|=0.4059.

A ratio of the focal length f of the optical image capturing system to a focal length fp of each of lens elements with positive refractive power is PPR. A ratio of the focal length f of the optical image capturing system to a focal length fn of each of lens elements with negative refractive power is NPR. In the optical image capturing system of the first embodiment, a sum of the PPR of all lens elements with positive refractive power is ΣPPR=f/f1+f/f2=1.1382. A sum of the NPR of all lens elements with negative refractive powers is ΣNPR=f/f2=0.4650, ΣPPR/|ΣNPR|=3.0391. The following relations are also satisfied: |f/f3|=0.3439, |f1/f2|=0.4349, |f2/f3|=0.7396.

In the optical image capturing system of the first embodiment, a distance from the object-side surface 112 of the first lens element to the image-side surface 124 of the second lens element is InTL. A distance from the object-side surface 112 of the first lens element to the image plane 180 is HOS. A distance from an aperture 100 to an image plane 180 is InS. Half of a diagonal length of an effective detection field of the image sensing device 190 is HOI. A distance from the image-side surface 124 of the second lens element to an image plane 180 is InB. The following relations are satisfied: InTL+InB=HOS, HOS=1.9461 mm, HOI=1.0 mm, HOS/HOI=1.9461, HOS/f=1.2745, InTL/HOS=0.5613, InS=1.8621 mm, and InS/HOS=0.9568.

In the optical image capturing system of the first embodiment, the sum of central thicknesses of all lens elements with refractive power on the optical axis is ΣTP. The following relations are satisfied: ΣTP=0.7585 mm and ΣTP/InTL=0.6943. Hereby, contrast ratio for the image formation in the optical image capturing system and defect-free rate for manufacturing the lens element can be given consideration simultaneously, and a proper back focal length is provided to dispose other optical components in the optical image capturing system.

In the optical image capturing system of the first embodiment, a curvature radius of the object-side surface 112 of the first lens element is R1. A curvature radius of the image-side surface 114 of the first lens element is R2. The following relation is satisfied: |R1/R2|=0.6866. Hereby, the first lens element may have proper strength of the positive refractive power, so as to avoid the longitudinal spherical aberration to increase too fast.

In the optical image capturing system of the first embodiment, a curvature radius of the object-side surface 122 of the second lens element is R3. A curvature radius of the image-side surface 124 of the second lens element is R4. The following relation is satisfied: (R3−R4)/(R3+R4)=−0.7542. Hereby, the astigmatism generated by the optical image capturing system can be corrected beneficially.

In the optical image capturing system of the first embodiment, the focal lengths of the first lens element 110 and the second lens element 120 are f1 and f2, respectively. A sum of focal lengths of all lens elements with positive refractive power is ΣPP. The following relations are satisfied: ΣPP=f1+f2=6.5326 mm and f1/(f1+f2)=0.2887. Hereby, it is favorable for allocating the positive refractive power of the first lens element 110 to other positive lens elements and the significant aberrations generated in the process of moving the incident light can be suppressed.

In the optical image capturing system of the first embodiment, the focal length of the second lens element 120 is f2. A sum of focal lengths of all lens elements with negative refractive power is ΣNP.

In the optical image capturing system of the first embodiment, a distance between the first lens element 110 and the second lens element 120 on the optical axis is IN12. The following relations are satisfied: IN12=0.3340 mm and IN12/f=0.2187. Hereby, the chromatic aberration of the lens elements can be improved, such that the performance can be increased.

In the optical image capturing system of the first embodiment, central thicknesses of the first lens element 110 and the second lens element 120 on the optical axis are TP1 and TP2, respectively. The following relations are satisfied: TP1=0.4020 mm, TP2=0.3365 mm, and (TP1+IN12)/TP2=2.0643. Hereby, the sensitivity produced by the optical image capturing system can be controlled, and the performance can be increased.

In the optical image capturing system of the first embodiment, the following relations are satisfied: TP1/TP2=1.1275. Hereby, the aberration generated by the process of moving the incident light can be adjusted slightly layer upon layer, and the total height of the optical image capturing system can be reduced.

In the optical image capturing system of the first embodiment, a total central thickness of the first lens element 110 and the second lens element 120 on the optical axis is ΣTP. The following relations are satisfied: TP2/ΣTP=0.4436. Hereby, the aberration generated by the process of moving the incident light can be adjusted slightly layer upon layer, and the total height of the optical image capturing system can be reduced.

In the optical image capturing system of the first embodiment, a distance in parallel with an optical axis from a maximum effective diameter position to an axial point on the object-side surface 112 of the first lens element is InRS11. A distance in parallel with an optical axis from a maximum effective diameter position to an axial point on the image-side surface 114 of the first lens element is InRS12. A central thickness of the first lens element 110 is TP1. The following relations are satisfied: InRS11=0.084 mm, InRS12=0.0478 mm, |InRS11|+|InRS12☐|=0.1318 mm, |InRS11☐|/TP1=0.2091, and |InRS12☐|/TP1=0.1188. Hereby, it is favorable for manufacturing and forming the lens element and for maintaining the minimization for the optical image capturing system.

In the optical image capturing system of the first embodiment, a distance perpendicular to the optical axis between a critical point C11 on the object-side surface 112 of the first lens element and the optical axis is HVT11. A distance perpendicular to the optical axis between a critical point C22 on the image-side surface 114 of the first lens element and the optical axis is HVT12. The following relations are satisfied: HVT11=0 mm and HVT12=0 mm.

n the optical image capturing system of the first embodiment, a distance in parallel with an optical axis from a maximum effective diameter position to an axial point on the object-side surface 122 of the second lens element is InRS21. A distance in parallel with an optical axis from a maximum effective diameter position to an axial point on the image-side surface 124 of the second lens element is InRS22. A central thickness of the second lens element 120 is TP2. The following relations are satisfied: InRS21=−0.0167 mm, InRS22=−0.1294 mm, |InRS21|+|InRS22|=0.1461 mm, |InRS21☐|/TP2=0.468, and |InRS22☐|/TP2=0.3629. Hereby, it is favorable for manufacturing and forming the lens element and for maintaining the minimization for the optical image capturing system.

In the optical image capturing system of the first embodiment, a distance perpendicular to the optical axis between a critical point C21 on the object-side surface 122 of the second lens element and the optical axis is HVT21. A distance perpendicular to the optical axis between a critical point C22 on the image-side surface 124 of the second lens element and the optical axis is HVT22. The following relations are satisfied: HVT21=0.3318 mm and HVT22=0.2980 mm and HVT21/HVT22=1.1134. Hereby, the aberration of surrounding view field can be corrected.

In the optical image capturing system of the first embodiment, the following relation is satisfied: HVT22/HOI=0.2980. Hereby, the aberration of surrounding view field can be corrected.

In the optical image capturing system of the first embodiment, the following relation is satisfied: HVT22/HOS=0.1531 Hereby, the aberration of surrounding view field can be corrected.

In the optical image capturing system of the first embodiment, an Abbe number of the first lens element is NA1. An Abbe number of the second lens element is NA2. The following relations are satisfied: |NA1−NA2|=32.6166 and NA1/NA2=2.3934. Hereby, the chromatic aberration of the optical image capturing system can be corrected.

In the optical image capturing system of the first embodiment, TV distortion and optical distortion for image formation in the optical image capturing system are TDT and ODT, respectively. The following relations are satisfied: |TDT|=1.1552%, |ODT|=2.1305%.

In the optical image capturing system of the first embodiment, a lateral aberration of the shortest operation wavelength of the positive direction tangential fan of the optical image capturing system passing through the edge of the aperture and incident on the image plane by 0.7 view field is denoted as PSTA, which is −0.016 mm. A lateral aberration of the longest operation wavelength of a positive direction tangential fan of the optical image capturing system passing through an edge of the aperture and incident on the image plane by 0.7 view field is denoted as PLTA, which is 0.012 mm. A lateral aberration of the shortest operation wavelength of a visible light of a negative direction tangential fan of the optical image capturing system passing through the edge of the aperture and incident on the image plane by 0.7 view field is denoted as NSTA, which is 0.012 mm. A lateral aberration of the longest operation wavelength of a negative direction tangential fan of the optical image capturing system passing through the edge of the aperture and incident on the image plane by 0.7 view field is denoted as NLTA, which is −0.002 mm. A lateral aberration of the shortest operation wavelength of the sagittal fan of the optical image capturing system passing through the edge of the aperture and incident on the image plane by 0.7 view field is denoted as SSTA, which is −0.011 mm. A lateral aberration of the longest operation wavelength of a sagittal fan of the optical image capturing system passing through the edge of the aperture and incident on the image plane by 0.7 view field is denoted as SLTA, which is 0.005 mm.

Please refer to the following Table 1 and Table 2.

The detailed data of the optical image capturing system of the first embodiment is as shown in

TABLE 1

Data of the optical image capturing system
f = 1.5270 mm, f/HEP = 2.52, HAF = 32.4537 deg, tan (HAF) = 0.6359

| Surface # | | Curvature Radius | Thickness | Material | Index | Abbe # | Focal length |
|---|---|---|---|---|---|---|---|
| 0 | Object | Plano | 600 | | | | |
| 1 | Ape. stop | Plano | 0.040 | | | | |
| 2 | Lens 1 | 0.593622567 | 0.402 | Plastic | 1.632 | 23.42 | 1.886 |
| 3 | | 0.864566511 | 0.151 | | | | |
| 4 | Shading sheet | Plano | 0.183 | | | | |
| 5 | Lens 2 | 2.149136259 | 0.357 | Plastic | 1.531 | 56.04 | 4.646 |
| 6 | IR-bandstop filter | 15.33826532 | 0.004 | BK7_SCHOTT | | | |
| 7 | | Plano | 0.850 | | | | |
| 8 | Image plane | Plano | | | | | |

Reference wavelength (d-line) = 555 nm; shield position: The clear aperture of the fourth surface is 0.350 mm.

As for the parameters of the aspheric surfaces of the first embodiment, reference is made to

TABLE 2

Aspheric Coefficients

| Surface # | 2 | 3 | 5 | 6 |
|---|---|---|---|---|
| k = | −1.260209E+00 | 3.752697E+00 | −1.533461E+02 | −3.276814E+03 |
| A4 = | 1.188727E−01 | 3.780380E−01 | 8.967125E−01 | 5.109782E−01 |
| A6 = | 2.594904E+01 | −4.741825E+00 | −1.657671E+01 | −6.908232E+00 |
| A8 = | −3.720166E+02 | 6.830764E+01 | 8.794850E+01 | 2.187913E+01 |
| A10 = | 1.911424E+03 | −9.125034E+01 | −2.651957E+02 | −3.274673E+01 |
| A12 = | 7.243751E+03 | −2.289203E+03 | 1.980490E+02 | −1.512005E+01 |
| A14 = | −7.265856E+04 | 1.532097E+04 | 2.486960E+02 | 8.852130E+01 |
| A16 = | 1.667886E+03 | −3.062662E+04 | 1.832814E+02 | −7.275365E+01 |
| A18 = | 0.00000E+00 | 0.00000E+00 | 0.00000E+00 | 0.00000E+00 |
| A20 = | 0.00000E+00 | 0.00000E+00 | 0.00000E+00 | 0.00000E+00 |

The numerical related to the length of outline curve is shown according to table 1 and table 2.

First embodiment (Reference wavelength = 555 nm)

| ARE | 1/2 (HEP) | ARE value | ARE-1/2 (HEP) | 2 (ARE/HEP) % | TP | ARE/TP (%) |
|---|---|---|---|---|---|---|
| 11 | 0.304 | 0.318 | 0.014 | 104.75% | 0.402 | 79.16% |
| 12 | 0.303 | 0.314 | 0.011 | 103.52% | 0.402 | 78.09% |
| 21 | 0.304 | 0.303 | −0.000 | 99.86% | 0.357 | 85.09% |
| 22 | 0.304 | 0.303 | −0.001 | 99.75% | 0.357 | 85.00% |

| ARE | EHD | ARS value | ARS-EHD | (ARS/EHD) % | TP | ARS/TP (%) |
|---|---|---|---|---|---|---|
| 11 | 0.304 | 0.318 | 0.014 | 104.73% | 0.402 | 79.16% |
| 12 | 0.303 | 0.314 | 0.011 | 103.52% | 0.402 | 78.09% |
| 21 | 0.488 | 0.493 | 0.005 | 100.99% | 0.357 | 138.29% |
| 22 | 0.662 | 0.703 | 0.041 | 106.19% | 0.357 | 197.24% |

Table 1 is the detailed structure data to the first embodiment in FIG. 1A, wherein the unit of the curvature radius, the thickness, the distance, and the focal length is millimeters (mm). Surfaces 0-16 illustrate the surfaces from the object side to the image plane in the optical image capturing system. Table 2 is the aspheric coefficients of the first embodiment, wherein k is the conic coefficient in the aspheric surface formula, and A1-A20 are the first to the twentieth order aspheric surface coefficient. Besides, the tables in the following embodiments are referenced to the schematic view and the aberration graphs, respectively, and definitions of parameters in the tables are equal to those in the Table 1 and the Table 2, so the repetitious details will not be given here.

The Second Embodiment (Embodiment 2)

Figure 2A:
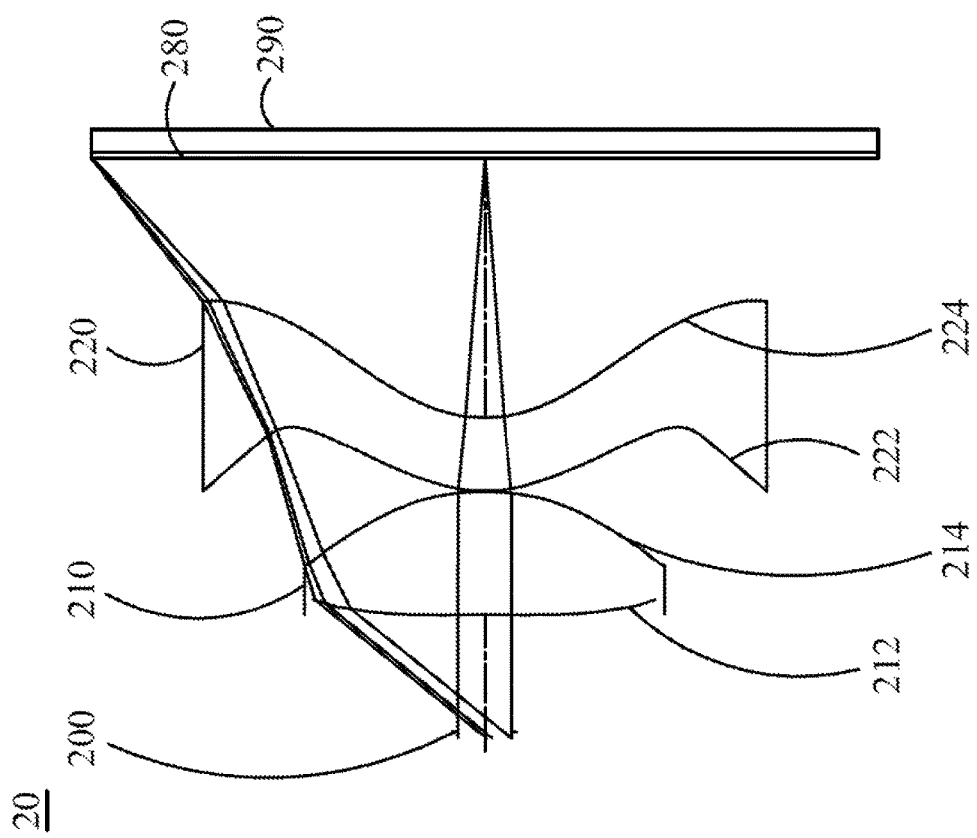
FIG. 2A is a schematic view of the optical image capturing system according to the second embodiment of the present application.
Figure 2B:
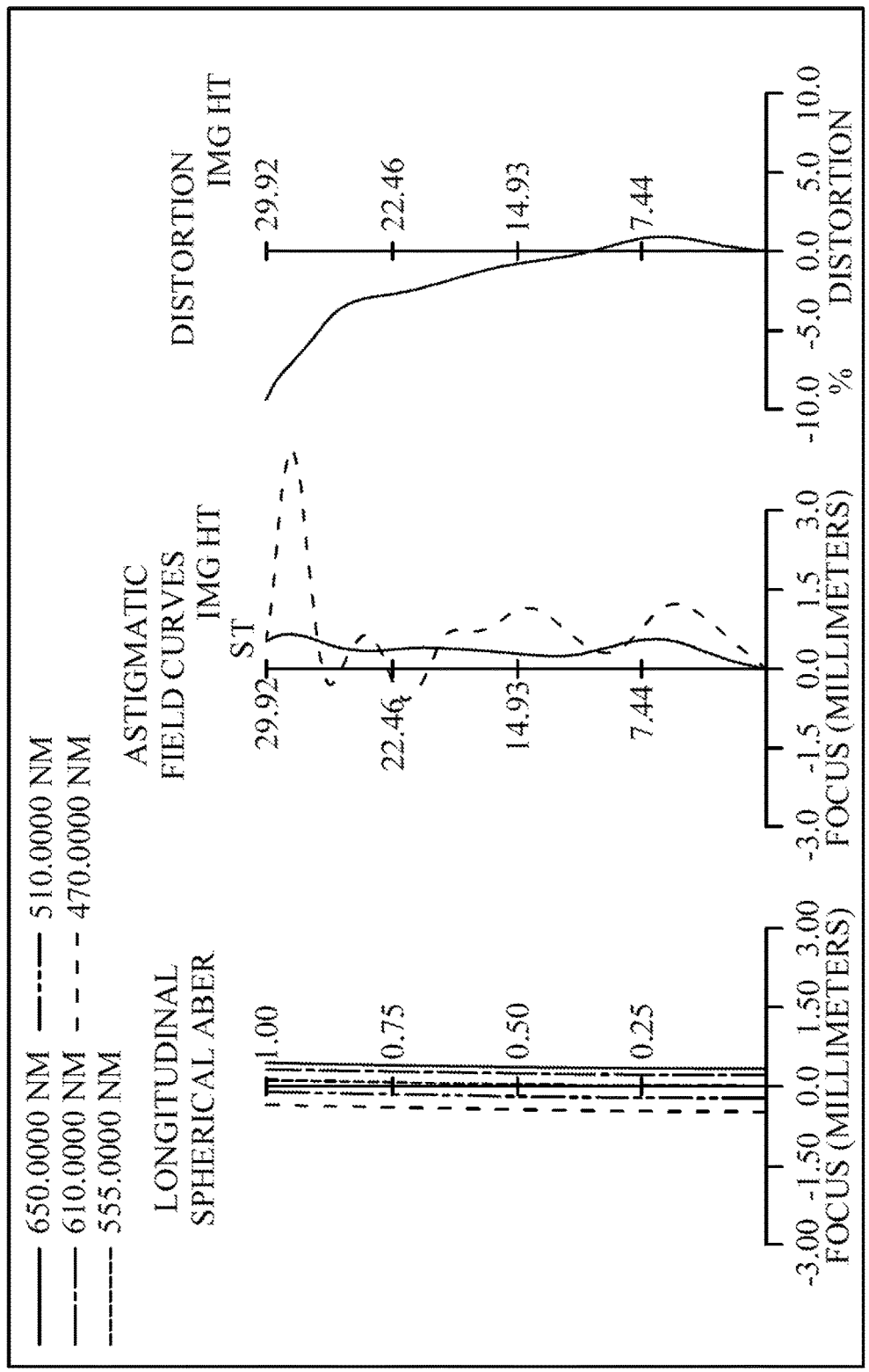
FIG. 2B is longitudinal spherical aberration curves, astigmatic field curves, and an optical distortion grid of the optical image capturing system in the order from left to right according to the second embodiment of the present application.
Figure 2C:
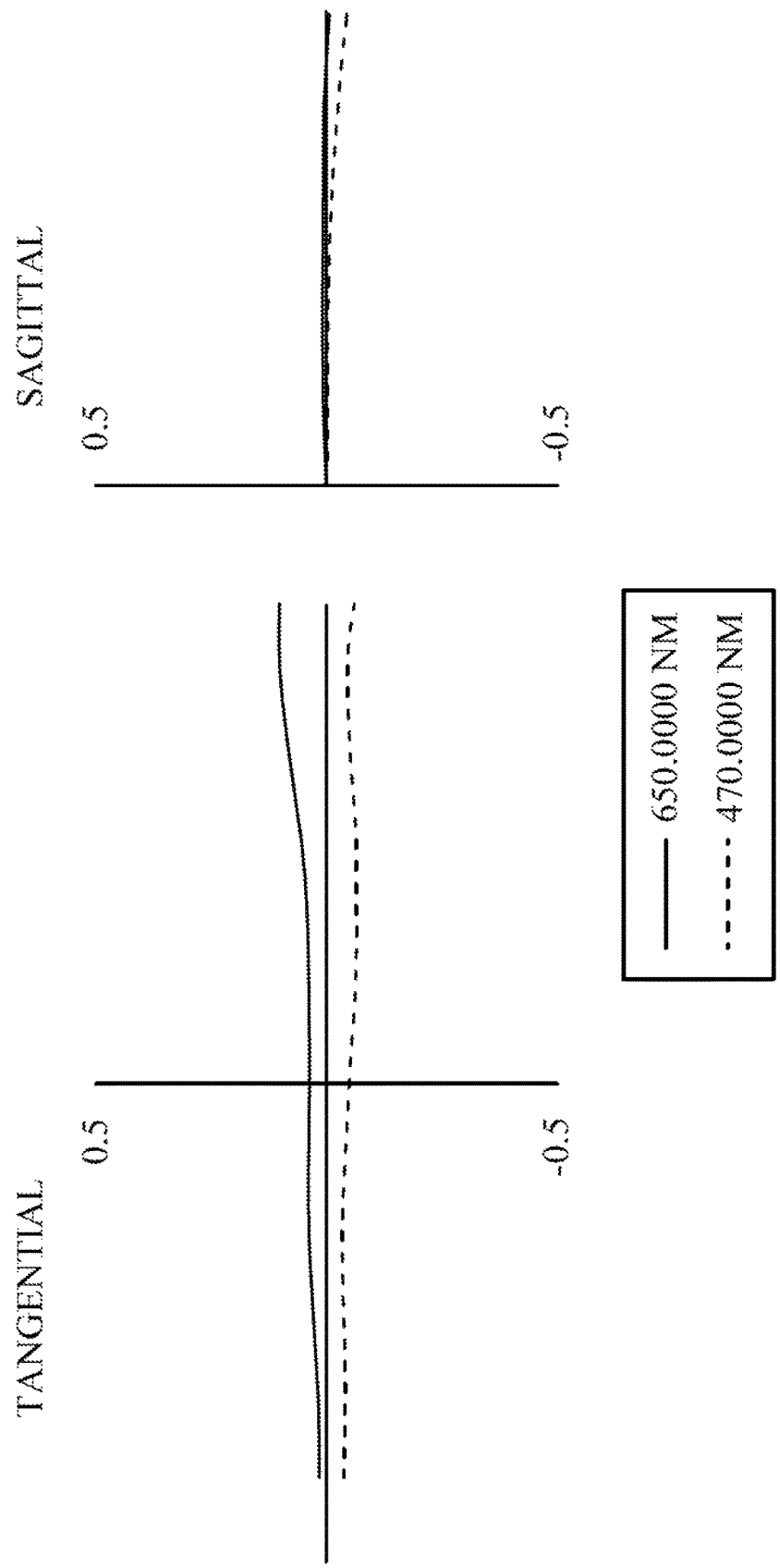
FIG. 2C is a lateral aberration diagram of tangential fan, sagittal fan, the longest operation wavelength and the shortest operation wavelength passing through an edge of the entrance pupil and incident on the image plane by 0.7 HOI according to the second embodiment of the present application.

Please refer to FIG. 2A, FIG. 2B and FIG. 2C, FIG. 2A is a schematic view of the optical image capturing system according to the second embodiment of the present application, FIG. 2B is longitudinal spherical aberration curves, astigmatic field curves, and an optical distortion curve of the optical image capturing system in the order from left to right according to the second embodiment of the present application, and FIG. 2C is a lateral aberration diagram of tangential fan, sagittal fan, the longest operation wavelength and the shortest operation wavelength passing through an edge of the entrance pupil and incident on the image plane by 0.7 HOI according to the second embodiment of the present application. As shown in FIG. 2A, in order from an object side to an image side, the optical image capturing system includes an aperture stop 200, a first lens element 210, a second lens element 220, an image plane 280, and an image sensing device 290. The object-side surface of the present embodiment, which is applied to the display designed with Full-HD or WQHD resolution such as HD 1080p display, is served as the purpose of the virtual reality. The imaging system of the present embodiment is designed with the resolution of 10.6 pixel/degree or 5.6 arcmin/pixel.

The first lens element 210 has positive refractive power and it is made of plastic material. The first lens element 210 has a convex object-side surface 212 and a convex image-side surface 214, and both of the object-side surface 212 and the image-side surface 214 are aspheric. The image-side surface 214 has an inflection point.

The second lens element 220 has positive refractive power and it is made of plastic material. The second lens element 220 has a convex object-side surface 222 and a concave image-side surface 224, and both of the object-side surface 222 and the image-side surface 224 are aspheric and have an inflection point.

Please refer to the following Table 3 and Table 4.

The detailed data of the optical image capturing system of the second embodiment is as shown in Table 3.

TABLE 3

Data of the optical image capturing system
f = 29.0140 mm; f/HEP = 6.9081; HAF (tan) = 50 deg

| Surface # | | Curvature Radius | Thickness | Material | Index | Abbe # | Focal length |
|---|---|---|---|---|---|---|---|
| 0 | Object | Plano | 600 | | | | |
| 1 | Shading sheet | Plano | 0.500 | | | | |
| 2 | Ape. stop | Plano | 9.500 | | | | |
| 3 | Lens 1 | 1221.130564 | 9.924 | Plastic | 1.491 | 57.21 | 43.2287 |
| 4 | | −21.61239783 | 0.104 | | | | |
| 5 | Lens 2 | 11.6803482 | 5.974 | Plastic | 1.585 | 29.90 | 149.8060 |
| 6 | | 10.91266851 | 21.000 | | | | |
| 7 | | Plano | 0.000 | BK7_SCHOTT | 1.517 | 64.13 | |
| 8 | Plano | 0.000 | | | | | |
| 9 | Image plane | Plano 0.000 | | | | | |

Reference wavelength (d-line) = 555 nm; shield position: The clear aperture of the first surface is 2.10 mm. The clear aperture of the fourth surface is 14.0 mm.

As for the parameters of the aspheric surfaces of the second embodiment, reference is made to Table 4.

TABLE 4

Aspheric Coefficients

| Surface # | 3 | 4 | 5 | 6 |
|---|---|---|---|---|
| k = | 9.000000E+02 | 9.943093E−03 | −2.424460E+00 | −1.647759E+00 |
| A4 = | 8.336907E−05 | −1.710684E−04 | −6.633458E−05 | 1.822323E−04 |
| A6 = | −5.505972E−06 | 1.259224E−06 | 3.012070E−06 | −3.346886E−06 |
| A8 = | 1.867790E−07 | 2.273300E−09 | −7.755593E−08 | 2.775645E−08 |
| A10 = | −3.010150E−09 | −5.493100E−10 | 1.063630E−09 | −1.411600E−10 |
| A12 = | 2.711000E−11 | 1.354000E−11 | −8.770000E−12 | 4.600000E−13 |
| A14 = | −1.400000E−13 | −1.500000E−13 | 4.000000E−14 | 0.000000E+00 |
| A16 = | 0.000000E+00 | 0.000000E+00 | 0.000000E+00 | 0.000000E+00 |
| A18 = | 0.000000E+00 | 0.000000E+00 | 0.000000E+00 | 0.000000E+00 |
| A20 = | 0.000000E+00 | 0.000000E+00 | 0.000000E+00 | 0.000000E+00 |

In the second embodiment, the presentation of the aspheric surface formula is similar to that in the first embodiment. Besides, the definitions of parameters in following tables are equal to those in the first embodiment, so the repetitious details will not be given here.

The following contents may be deduced from Table 3 and Table 4.

| Second embodiment (Primary reference wavelength = 555 nm) | | | | | |
|---|---|---|---|---|---|
| InRS11 | InRS12 | InRS21 | InRS22 | InRSO | InRSI |
| 1.1894 | −5.9153 | 4.6559 | 9.4333 | 5.8453 | 15.3485 |
| Σ \|InRS\| | \|InRS11\|/ TP1 | \|InRS12\|/ TP1 | \|InRS21\|/ TP2 | \|InRS22\|/ TP2 | TP1/TP2 |
| 21.1938 | 0.1198 | 0.5960 | 0.7793 | 1.5790 | 1.6611 |
| \|f/f1\| | \|f/f2\| | \|f1/f2\| | IN12/f | HOS/f | HOI |
| 0.6712 | 0.1937 | 0.2886 | 0.0036 | 1.2753 | 30.0000 |
| HVT11 | HVT12 | HVT21 | HVT22 | HVT22/ HOI | HVT22/ HOS |
| 0.0000 | 0.0000 | 15.0245 | 0.0000 | 0.0000 | 0.0000 |
| HOS | InTL | HOS/HOI | InS/HOS | ODT % | TDT % |
| 37.0028 | 16.0028 | 1.2334 | 1.2567 | −9.5741 | 8.0091 |
| PSTA | PLTA | NSTA | NLTA | SSTA | SLTA |
| −0.061 mm | 0.105 mm | −0.045 mm | 0.017 mm | −0.047 mm | −0.008 mm |

The following contents may be deduced from Table 3 and Table 4.

| Second embodiment (Primary reference wavelength = 555 nm) | | | | | |
|---|---|---|---|---|---|
| HIF121 | 12.8088 | HIF121/HOI | 0.4270 | SGI121 | 5.1208 | \|SGI121\|/(\|SGI121\| + TP1) | 0.3404 |
| HIF211 | 9.6803 | HIF211/HOI | 0.3227 | SGI211 | 3.1410 | \|SGI211\|/(\|SGI211\| + TP2) | 0.2404 |
| HIF221 | 10.3659 | HIF221/HOI | 0.3455 | SGI221 | 4.5571 | \|SGI221\|/(\|SGI221\| + TP2) | 0.3147 |

The numerical related to the length of outline curve is shown according to table 3 and table 4.

| Second embodiment (Reference wavelength = 555 nm) | | | | | | |
|---|---|---|---|---|---|---|
| ARE | 1/2 (HEP) | ARE value | ARE-1/2 (HEP) | 2 (ARE/ HEP) % | TP | ARE/TP (%) |
| 11 | 2.100 | 2.100 | 0.000 | 100.00% | 9.924 | 21.16% |
| 12 | 2.100 | 2.104 | 0.004 | 100.17% | 9.924 | 21.20% |
| 21 | 2.100 | 2.111 | 0.011 | 100.51% | 5.974 | 35.33% |
| 22 | 2.100 | 2.113 | 0.013 | 100.63% | 5.974 | 35.37% |
| ARS | EHD | ARS value | ARS-EHD | (ARS/ EHD) % | TP | ARS/TP (%) |
| 11 | 13.202 | 271.448 | 258.246 | 2056.08% | 9.924 | 2735.20% |
| 12 | 14.000 | 1062.523 | 1048.523 | 7589.45% | 9.924 | 10706.34% |
| 21 | 16.851 | 2892.579 | 2875.728 | 17165.95% | 5.974 | 48416.78% |
| 22 | 21.923 | 3222.332 | 3200.409 | 14698.60% | 5.974 | 53936.27% |

The Third Embodiment (Embodiment 3)

Figure 3A:
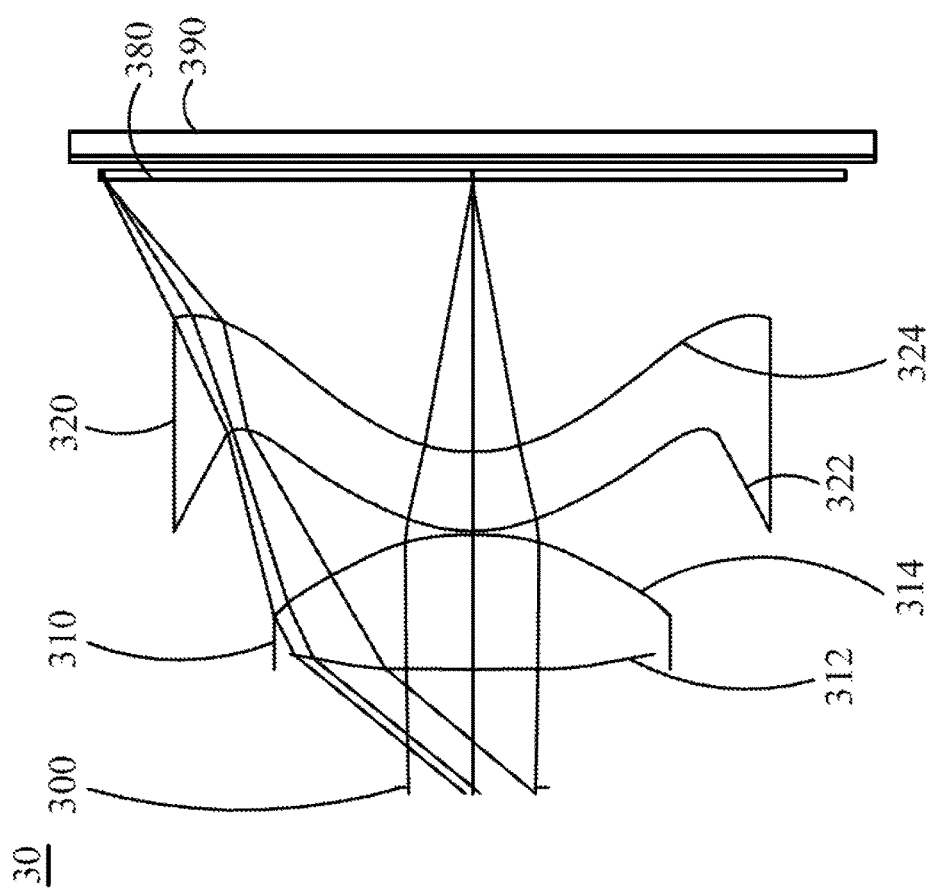
FIG. 3A is a schematic view of the optical image capturing system according to the third embodiment of the present application.
Figure 3B:
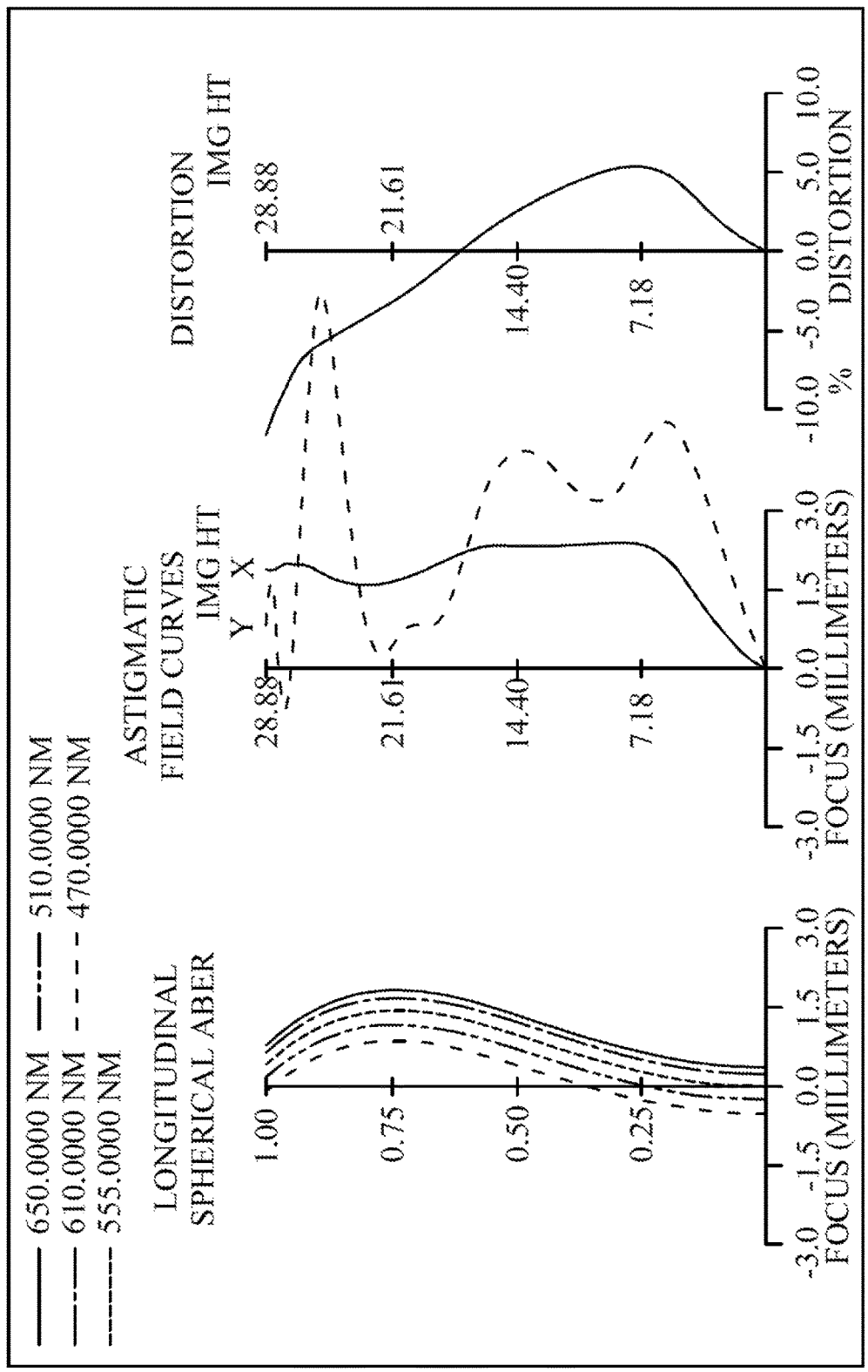
FIG. 3B is longitudinal spherical aberration curves, astigmatic field curves, and an optical distortion grid of the optical image capturing system in the order from left to right according to the third embodiment of the present application.
Figure 3C:
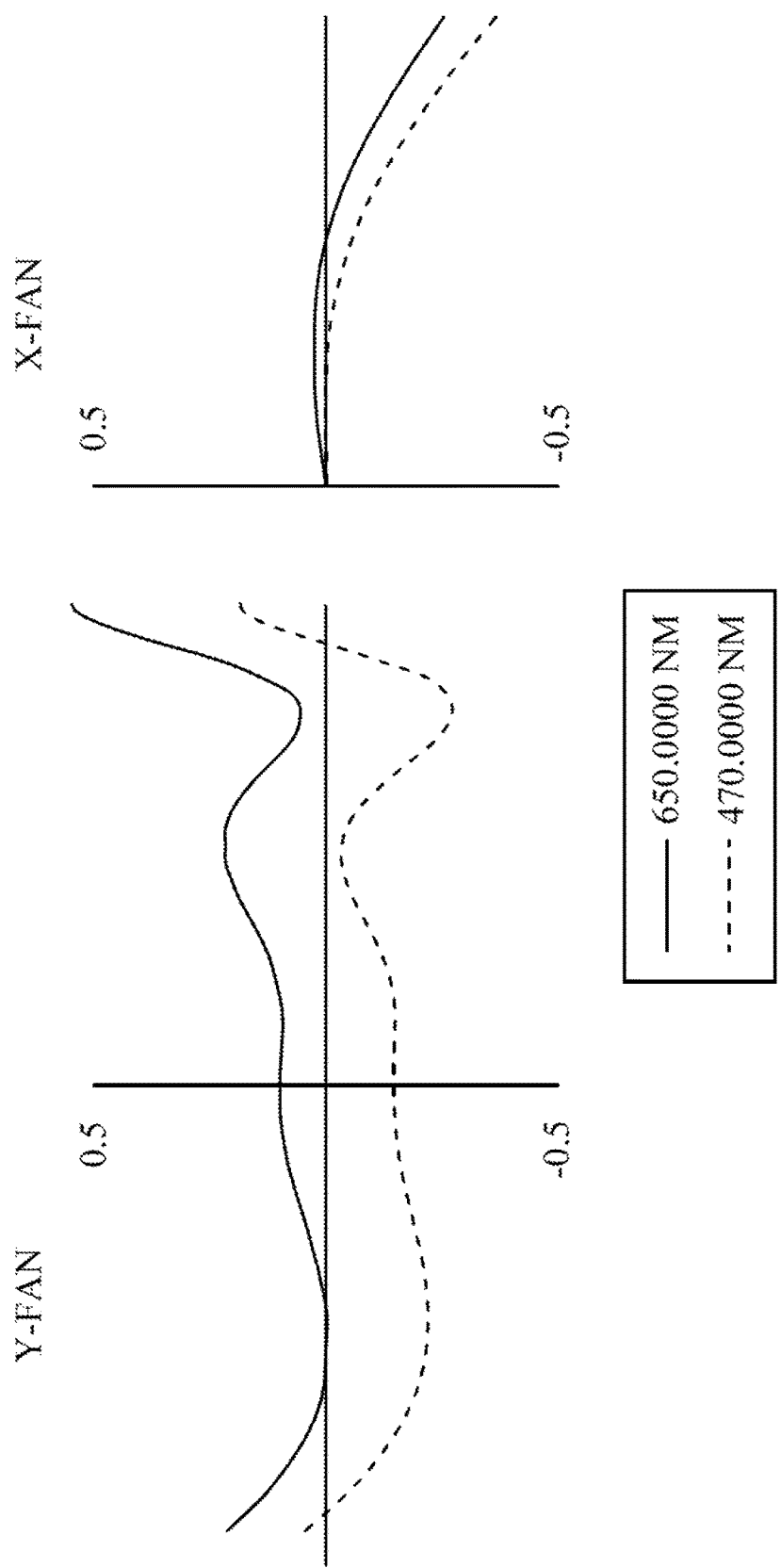
FIG. 3C is a lateral aberration diagram of tangential fan, sagittal fan, the longest operation wavelength and the shortest operation wavelength passing through an edge of the entrance pupil and incident on the image plane by 0.7 HOI according to the third embodiment of the present application.

Please refer to FIG. 3A, FIG. 3B and FIG. 3C, FIG. 3A is a schematic view of the optical image capturing system according to the third embodiment of the present application, FIG. 3B is longitudinal spherical aberration curves, astigmatic field curves, and an optical distortion curve of the optical image capturing system in the order from left to right according to the third embodiment of the present application, and FIG. 3C is a lateral aberration diagram of tangential fan, sagittal fan, the longest operation wavelength and the shortest operation wavelength passing through an edge of the entrance pupil and incident on the image plane by 0.7 HOI according to the third embodiment of the present application. As shown in FIG. 3A, in order from an object side to an image side, the optical image capturing system includes an aperture stop 300, a first lens element 310, a second lens element 320, an image plane 380, and an image sensing device 390. The object-side surface of the present embodiment, which is applied to the display designed with Full-HD or WQHD resolution such as HD 1080p display, is served as the purpose of the virtual reality. The imaging system of the present embodiment is designed with the resolution of 10.6 pixel/degree or 5.6 arcmin/pixel.

The first lens element 310 has positive refractive power and it is made of plastic material. The first lens element 310 has a convex object-side surface 312 and a convex image-side surface 314, and both of the object-side surface 312 and the image-side surface 314 are aspheric. The object-side surface 312 has an inflection point and the image-side surface 314 has two inflection points.

The second lens element 320 has positive refractive power and it is made of plastic material. The second lens element 320 has a convex object-side surface 322 and a concave image-side surface 324, and both of the object-side surface 322 and the image-side surface 324 are aspheric and have an inflection point.

Please refer to the following Table 5 and Table 6.

The detailed data of the optical image capturing system of the third embodiment is as shown in Table 5.

TABLE 5

Data of the optical image capturing system
f = 25.6515 mm; f/HEP = 2.7021; HAF (tan) = 49.950 deg

| Surface # | | Curvature Radius | Thickness | Material | Index | Abbe # | Focal length |
|---|---|---|---|---|---|---|---|
| 0 | Object | Plano | 250 | | | | |
| 1 | Shading sheet | Plano | 0.500 | | | | |
| 2 | Ape. stop | Plano | 9.503 | | | | |
| 3 | Lens 1 | 657.3110644 | 10.924 | Plastic | 1.491 | 57.21 | 47.3441 |
| 4 | | −24.044851 | 0.300 | | | | |
| 5 | Lens 2 | 13.0574377 | 6.406 | Plastic | 1.585 | 29.90 | 67.1288 |
| 6 | | 15.95830706 | 21.968 | | | | |
| 7 | | Plano | 0.800 | BK7_SCHOTT | 1.517 | 64.13 | |
| 8 | | Plano | 0.000 | | | | |
| 9 | Image plane | Plano | 0.000 | | | | |

Reference wavelength (d-line) = 555 nm; shield position: The clear aperture of the first surface is 5.0 mm. The clear aperture of the fourth surface is 15.50 mm.

As for the parameters of the aspheric surfaces of the third embodiment, reference is made to Table 6.

TABLE 6

Aspheric Coefficients

| Surface # | 3 | 4 | 5 | 6 |
|---|---|---|---|---|
| k = | 9.000000E+02 | 3.881472E−02 | −2.137457E+00 | −9.382222E−01 |
| A4 = | 7.805767E−05 | 8.948627E−05 | 1.423457E−04 | 4.019200E−04 |
| A6 = | −5.479692E−06 | −8.460420E−06 | −3.438835E−06 | −8.008123E−06 |
| A8 = | 1.871386E−07 | 1.762869E−07 | 3.221229E−08 | 7.784628E−08 |
| A10 = | −3.010170E−09 | −2.180880E−09 | −1.273300E−10 | −4.417100E−10 |
| A12 = | 2.711000E−11 | 1.949000E−11 | 0.000000E+00 | 1.540000E−12 |
| A14 = | −1.500000E−13 | −1.200000E−13 | 0.000000E+00 | 0.000000E+00 |
| A16 = | 0.000000E+00 | 0.000000E+00 | 0.000000E+00 | 0.000000E+00 |
| A18 = | 0.000000E+00 | 0.000000E+00 | 0.000000E+00 | 0.000000E+00 |
| A20 = | 0.000000E+00 | 0.000000E+00 | 0.000000E+00 | 0.000000E+00 |

The presentation of the aspheric surface formula in the third embodiment is similar to that in the first embodiment. Besides, the definitions of parameters in following tables are equal to those in the first embodiment so the repetitious details will not be given here.

The following contents may be deduced from Table 5 and Table 6.

Third embodiment (Primary reference wavelength: 555 nm)

| InRS11 | InRS12 | InRS21 | InRS22 | InRSO | InRSI |
|---|---|---|---|---|---|
| 1.1615 | −6.5629 | 7.8489 | 10.8012 | 9.0103 | 17.3641 |

| Σ \|InRS\| | \|InRS11\|/TP1 | \|InRS12\|/TP1 | \|InRS21\|/TP2 | \|InRS22\|/TP2 | TP1/TP2 |
|---|---|---|---|---|---|
| 26.3744 | 0.1063 | 0.6008 | 1.2252 | 1.6860 | 1.7052 |

| \|f/f1\| | \|f/f2\| | \|f1/f2\| | IN12/f | HOS/f | HOI |
|---|---|---|---|---|---|
| 0.5418 | 0.3821 | 0.7053 | 0.0117 | 1.5749 | 28.9800 |

Third embodiment (Primary reference wavelength: 555 nm)

| HVT11 | HVT12 | HVT21 | HVT22 | HVT22/HOI | HVT22/HOS |
|---|---|---|---|---|---|
| 0.0000 | 0.0000 | 18.1122 | 22.0342 | 0.7603 | 0.5454 |

| HOS | InTL | HOS/HOI | InS/HOS | ODT % | TDT % |
|---|---|---|---|---|---|
| 40.3982 | 17.6306 | 1.3940 | 1.2352 | −11.7974 | 12.0765 |

| PSTA | PLTA | NSTA | NLTA | SSTA | SLTA |
|---|---|---|---|---|---|
| 0.195 mm | 0.582 mm | 0.047 mm | 0.225 mm | −0.411 mm | −0.290 mm |

The following contents may be deduced from Table 5 and Table 6.

| Related inflection point values of third embodiment (Primary reference wavelength: 555 nm) | | | | | | | |
|---|---|---|---|---|---|---|---|
| HIF111 | 12.2789 | HIF111/HOI | 0.4237 | SGI111 | 0.8668 | \|SGI111\|/(\|SGI111\| + TP1) | 0.0735 |
| HIF121 | 9.7443 | HIF121/HOI | 0.3362 | SGI121 | −2.6222 | \|SGI121\|/(\|SGI121\| + TP1) | 0.1936 |
| HIF122 | 10.8049 | HIF122/HOI | 0.3728 | SGI122 | −3.2072 | \|SGI122\|/(\|SGI122\| + TP1) | 0.2270 |
| HIF211 | 13.9313 | HIF211/HOI | 0.4807 | SGI221 | 6.0323 | \|SGI211\|/(\|SGI211\| + TP2) | 0.3558 |
| HIF221 | 13.6413 | HIF221/HOI | 0.4707 | SGI221 | 6.6306 | \|SGI122\|/(\|SGI221\| + TP2) | 0.3777 |

The numerical related to the length of outline curve is shown according to table 5 and table 6.

| Third embodiment (Reference wavelength = 555 nm) | | | | | | |
|---|---|---|---|---|---|---|
| ARE | 1/2 (HEP) | ARE value | ARE−1/2 (HEP) | 2 (ARE/ HEP) % | TP | ARE/ TP (%) |
| 11 | 5.000 | 5.000 | 0.000 | 100.00% | 10.924 | 45.77% |
| 12 | 5.000 | 5.042 | 0.042 | 100.84% | 10.924 | 46.15% |
| 21 | 5.000 | 5.122 | 0.122 | 102.44% | 6.406 | 79.95% |
| 22 | 5.000 | 5.121 | 0.121 | 102.41% | 6.406 | 79.93% |
| ARS | EHD | ARS value | ARS− EHD | (ARS/ EHD) % | TP | ARS/ TP (%) |
| 11 | 14.117 | 874.437 | 860.320 | 6194.11% | 10.924 | 8004.49% |
| 12 | 15.500 | 3076.390 | 3060.890 | 198.4768% | 10.924 | 281.6090% |
| 21 | 19.127 | 413.151 | 394.024 | 2160.05% | 6.406 | 6449.13% |
| 22 | 23.350 | 24898.412 | 24875.062 | 106629.36% | 6.406 | 388655.34% |

The Fourth Embodiment (Embodiment 4)

Figure 4A:
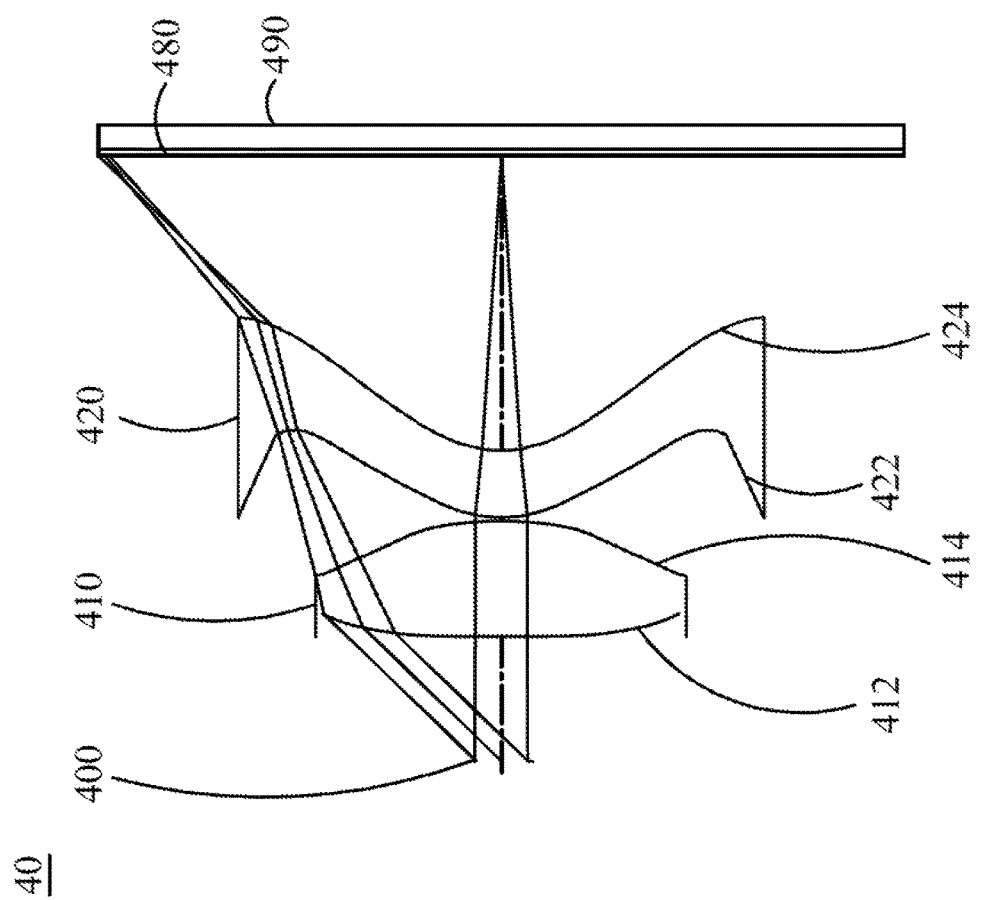
FIG. 4A is a schematic view of the optical image capturing system according to the fourth embodiment of the present application.
Figure 4B:
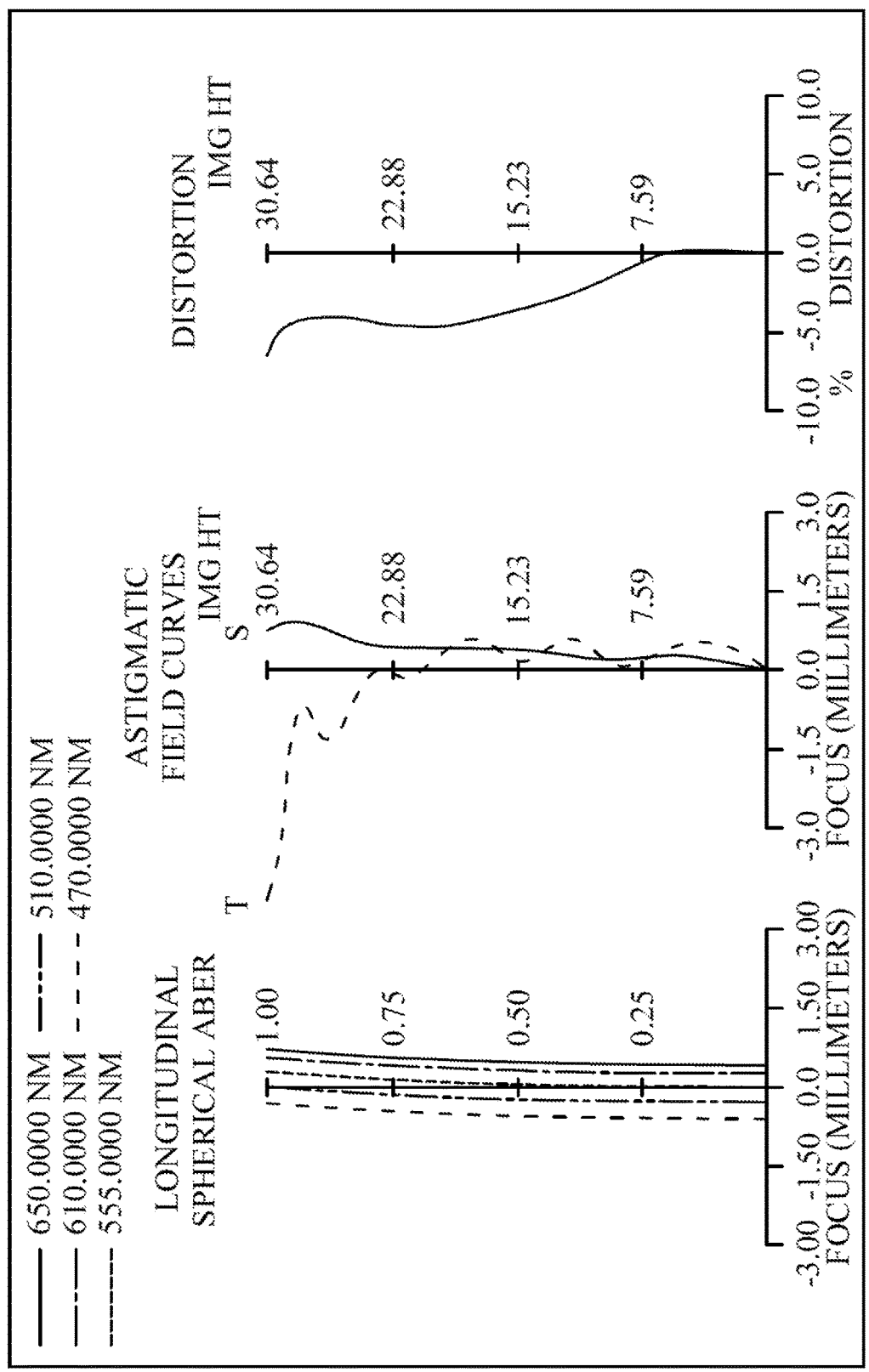
FIG. 4B is longitudinal spherical aberration curves, astigmatic field curves, and an optical distortion grid of the optical image capturing system in the order from left to right according to the fourth embodiment of the present application.
Figure 4C:
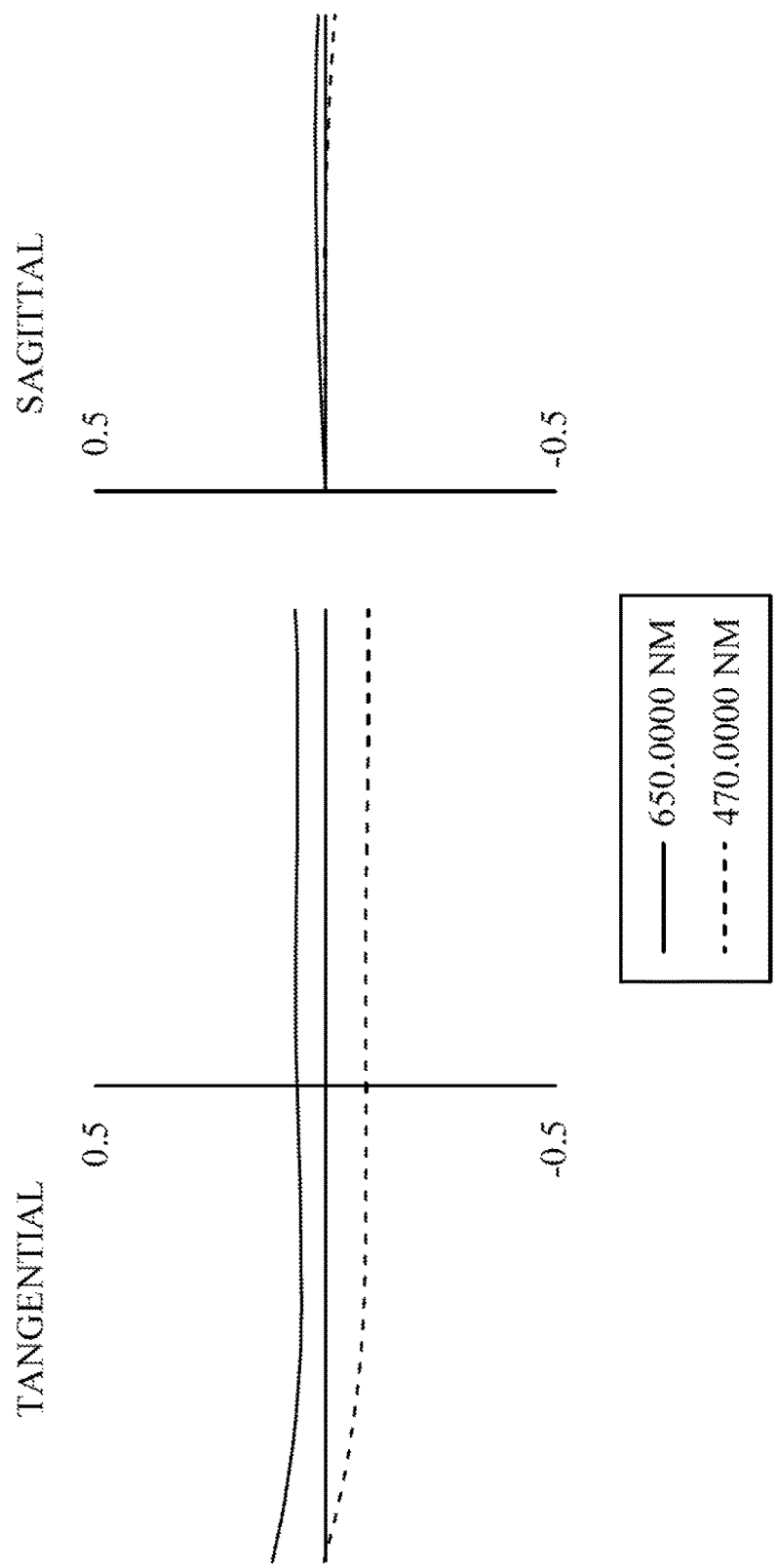
FIG. 4C is a lateral aberration diagram of tangential fan, sagittal fan, the longest operation wavelength and the shortest operation wavelength passing through an edge of the entrance pupil and incident on the image plane by 0.7 HOI according to the fourth embodiment of the present application.

Please refer to FIG. 4A, FIG. 4B and FIG. 4C, FIG. 4A is a schematic view of the optical image capturing system according to the fourth embodiment of the present application, FIG. 4B is longitudinal spherical aberration curves, astigmatic field curves, and an optical distortion curve of the optical image capturing system in the order from left to right according to the fourth embodiment of the present application, and FIG. 4C is a lateral aberration diagram of tangential fan, sagittal fan, the longest operation wavelength and the shortest operation wavelength passing through an edge of the entrance pupil and incident on the image plane by 0.7 HOI according to the fourth embodiment of the present application. As shown in FIG. 4A, in order from an object side to an image side, the optical image capturing system includes an aperture stop 400, a first lens element 410, a second lens element 420, an image plane 480, and an image sensing device 490. The object-side surface of the present embodiment, which is applied to the display designed with Full-HD or WQHD resolution such as HD 1080p display, is served as the purpose of the virtual reality. The imaging system of the present embodiment is designed with the resolution of 10.6 pixel/degree or 5.6 arcmin/pixel.

The first lens element 410 has positive refractive power and it is made of plastic material. The first lens element 410 has a convex object-side surface 412 and a convex image-side surface 414, and both of the object-side surface 412 and the image-side surface 414 are aspheric. The image-side surface 414 has three inflection points.

The second lens element 420 has positive refractive power and it is made of plastic material. The second lens element 420 has a convex object-side surface 422 and a concave image-side surface 424, and both of the object-side surface 422 and the image-side surface 424 are aspheric and have an inflection point.

Please refer to the following Table 7 and Table 8.

The detailed data of the optical image capturing system of the fourth embodiment is as shown in Table 7.

TABLE 7

| Data of the optical image capturing system f = 32.8882 mm; f/HEP = 8.0215; HAF (tan) = 45.0111 deg | | | | | | | |
|---|---|---|---|---|---|---|---|
| Surface # | | Curvature Radius | Thickness | Material | Index | Abbe # | Focal length |
| 0 | Object | Plano | At infinity | | | | |
| 1 | Ape. stop | Plano | 10.050 | | | | |
| 2 | Lens 1 | 457.5384828 | 9.331 | Plastic | 1.491 | 57.21 | 53.3138 |
| 3 | | −27.67159296 | 0.315 | | | | |
| 4 | Lens 2 | 9.966874496 | 5.351 | Plastic | 1.585 | 29.90 | 129.929 |
| 5 | | 9.181169376 | 23.801 | | | | |
| 6 | | Plano | 0.000 | BK7_ SCHOTT | 1.517 | 64.13 | |
| 7 | | Plano | 0.000 | | | | |
| 8 | Image plane | Plano | | | | | |

Reference wavelength (d-line) = 555 nm; shield position: The clear aperture of the third surface is 14.438 mm.

As for the parameters of the aspheric surfaces of the fourth embodiment, reference is made to Table 8.

TABLE 8

Aspheric Coefficients

| Surface # | 2 | 3 | 4 | 5 |
|---|---|---|---|---|
| k = | 9.000000E+02 | −9.473691E−01 | −1.936474E+00 | −1.722886E+00 |
| A4 = | 7.935230E−05 | 4.698844E−05 | 1.774855E−04 | 3.009292E−04 |
| A6 = | −4.291540E−06 | −4.392534E−06 | −4.457656E−06 | −7.870102E−06 |
| A8 = | 1.327677E−07 | 9.066300E−09 | 1.857921E−08 | 8.923823E−08 |
| A10 = | −1.940420E−09 | 1.027320E−09 | 3.365500E−10 | −5.690500E−10 |
| A12 = | 1.585000E−11 | −1.419000E−11 | −4.950000E−12 | 2.200000E−12 |
| A14 = | −8.000000E−14 | 9.000000E−14 | 3.000000E−14 | −1.000000E−14 |
| A16 = | 0.000000E+00 | 0.000000E+00 | 0.000000E+00 | 0.000000E+00 |
| A18 = | 0.000000E+00 | 0.000000E+00 | 0.000000E+00 | 0.000000E+00 |
| A20 = | 0.000000E+00 | 0.000000E+00 | 0.000000E+00 | 0.000000E+00 |

The presentation of the aspheric surface formula in the fourth embodiment is similar to that in the first embodiment. Besides the definitions of parameters in following tables are equal to those in the first embodiment so the repetitious details will not be given here.

The following contents may be deduced from Table 7 and Table 8.

Fourth embodiment (Primary reference wavelength: 555 nm)

| InRS11 | InRS12 | InRS21 | InRS22 | InRSO | InRSI |
|---|---|---|---|---|---|
| 1.7896 | −4.4034 | 6.7315 | 10.7995 | 8.5211 | 15.2029 |

| Σ |InRS| | |InRS11|/TP1 | |InRS12|/TP1 | |InRS21|/TP2 | |InRS22|/TP2 | TP1/TP2 |
|---|---|---|---|---|---|
| 23.7239 | 0.1918 | 0.4719 | 1.2580 | 2.0183 | 1.7439 |

Fourth embodiment (Primary reference wavelength: 555 nm)

| |f/f1| | |f/f2| | |f1/f2| | IN12/f | HOS/f | HOI |
|---|---|---|---|---|---|
| 0.6169 | 0.2531 | 0.4103 | 0.0096 | 1.1797 | 30.6000 |

| HVT11 | HVT12 | HVT21 | HVT22 | HVT22/HOI | HVT22/HOS |
|---|---|---|---|---|---|
| 0.0000 | 0.0000 | 16.0895 | 0.0000 | 0.0000 | 0.0000 |

| HOS | InTL | HOS/HOI | InS/HOS | ODT % | TDT % |
|---|---|---|---|---|---|
| 38.7975 | 14.9970 | 1.2679 | 1.2590 | −6.6595 | 2.5701 |

| PSTA | PLTA | NSTA | NLTA | SSTA | SLTA |
|---|---|---|---|---|---|
| −0.095 mm | 0.073 mm | −0.004 mm | 0.123 mm | −0.023 mm | 0.016 mm |

The following contents may be deduced from Table 7 and Table 8.

Related inflection point values of fourth embodiment (Primary reference wavelength: 555 nm)

| HIF121 | 8.9027 | HIF121/HOI | 0.2909 | SGI121 | −1.9636 | |SGI121|/(|SGI121| + TP1) | 0.1738 |
|---|---|---|---|---|---|---|---|
| HIF122 | 10.8875 | HIF122/HOI | 0.3558 | SGI122 | −2.8967 | |SGI122|/(|SGI122| + TP1) | 0.2369 |
| HIF123 | 12.6370 | HIF123/HOI | 0.4130 | SGI123 | −3.7238 | |SGI123|/(|SGI123| + TP1) | 0.2852 |
| HIF211 | 12.3836 | HIF211/HOI | 0.4047 | SGI211 | 5.3802 | |SGI211|/(|SGI211| + TP2) | 0.3657 |
| HIF221 | 12.3406 | HIF221/HOI | 0.4033 | SGI221 | 6.5366 | |SGI221|/(|SGI221| + TP2) | 0.4119 |

The numerical related to the length of outline curve is shown according to table 7 and table 8.

Fourth embodiment (Reference wavelength =555 nm)

| ARE | ½(HEP) | ARE value | ARE − ½(HEP) | 2(ARE/HEP) % | TP | ARE/TP (%) |
|---|---|---|---|---|---|---|
| 11 | 2.050 | 2.050 | 0.000 | 100.00% | 9.331 | 21.97% |
| 12 | 2.050 | 2.052 | 0.002 | 100.09% | 9.331 | 21.99% |
| 21 | 2.050 | 2.064 | 0.014 | 100.71% | 5.351 | 38.58% |
| 22 | 2.050 | 2.067 | 0.017 | 100.85% | 5.351 | 38.64% |

| ARS | EHD | ARS value | ARS − EHD | (ARS/EHD) % | TP | ARS/TP (%) |
|---|---|---|---|---|---|---|
| 11 | 13.808 | 320.390 | 306.582 | 2320.36% | 9.331 | 3433.53% |
| 12 | 14.437 | 765.317 | 750.879 | 5300.89% | 9.331 | 8201.68% |
| 21 | 17.371 | 4003.864 | 3986.493 | 23048.58% | 5.351 | 74827.93% |
| 22 | 20.669 | 18281.081 | 18260.412 | 88445.90% | 5.351 | 341653.80% |

The Fifth Embodiment (Embodiment 5)

Figure 5A:
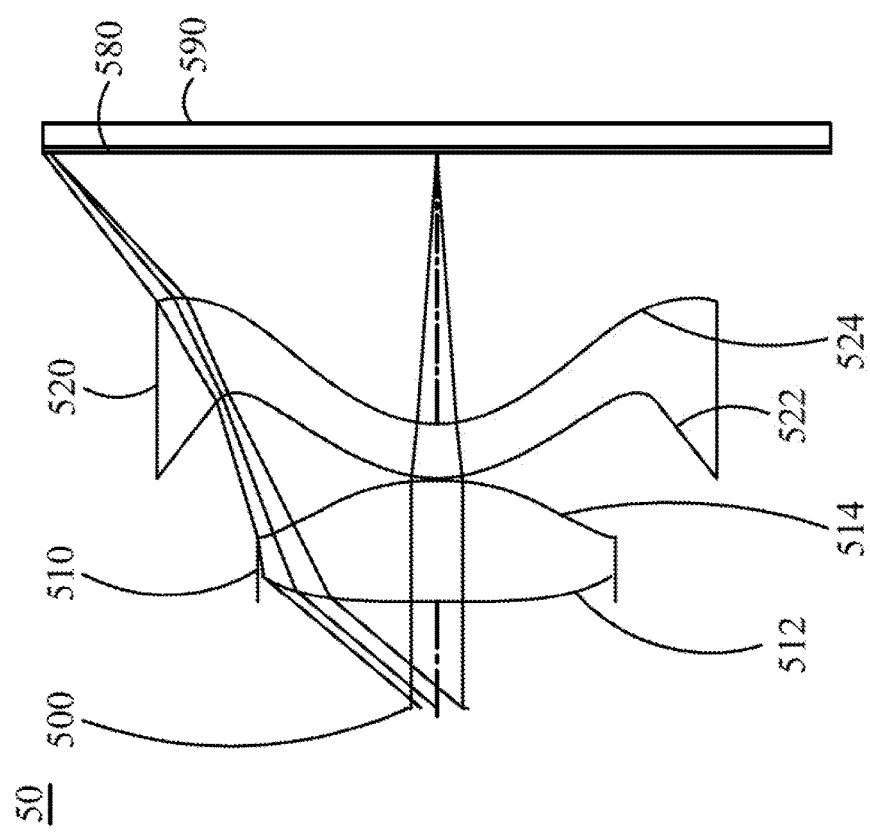
FIG. 5A is a schematic view of the optical image capturing system according to the fifth embodiment of the present application.
Figure 5B:
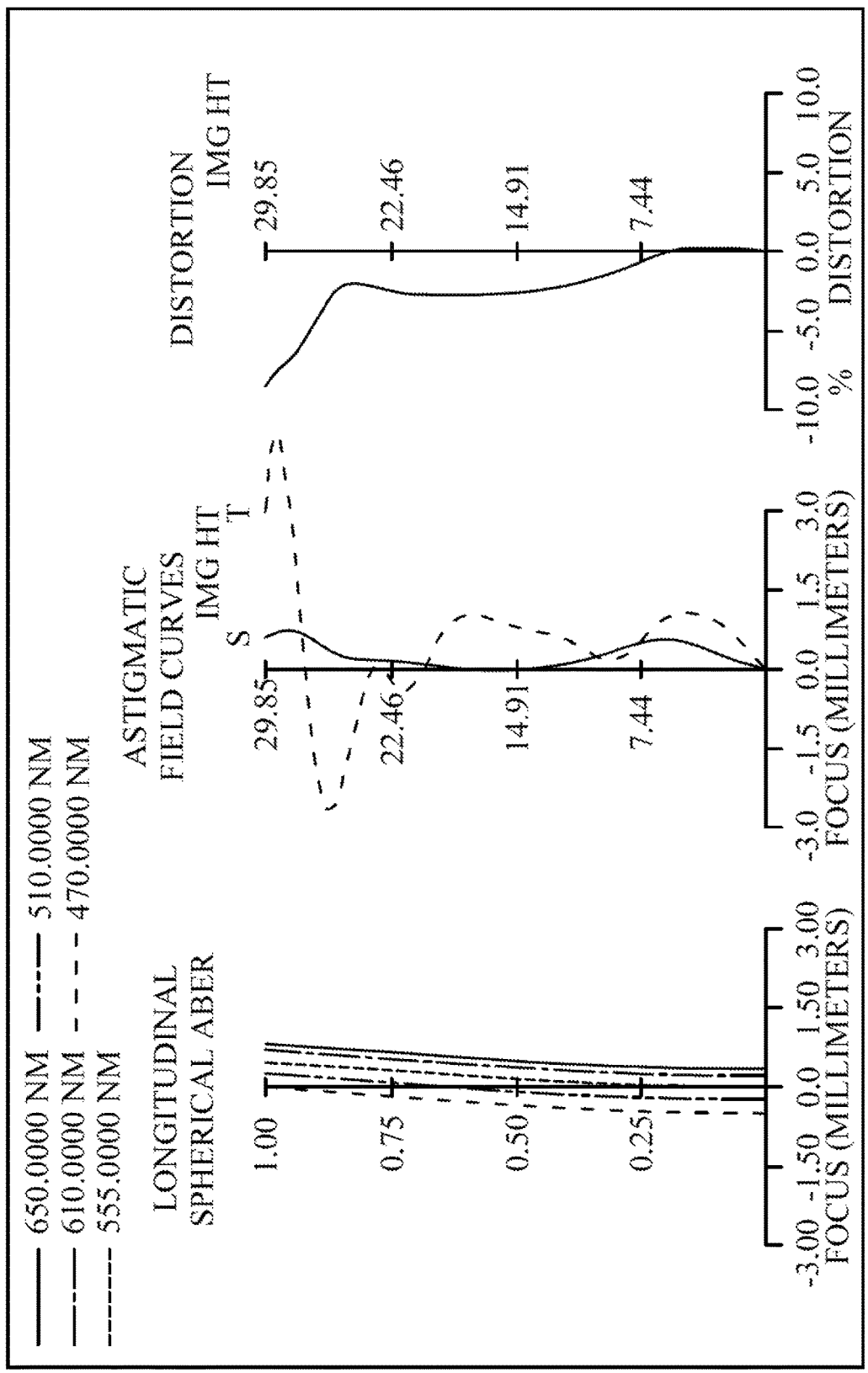
FIG. 5B is longitudinal spherical aberration curves, astigmatic field curves, and an optical distortion grid of the optical image capturing system in the order from left to right according to the fifth embodiment of the present application.
Figure 5C:
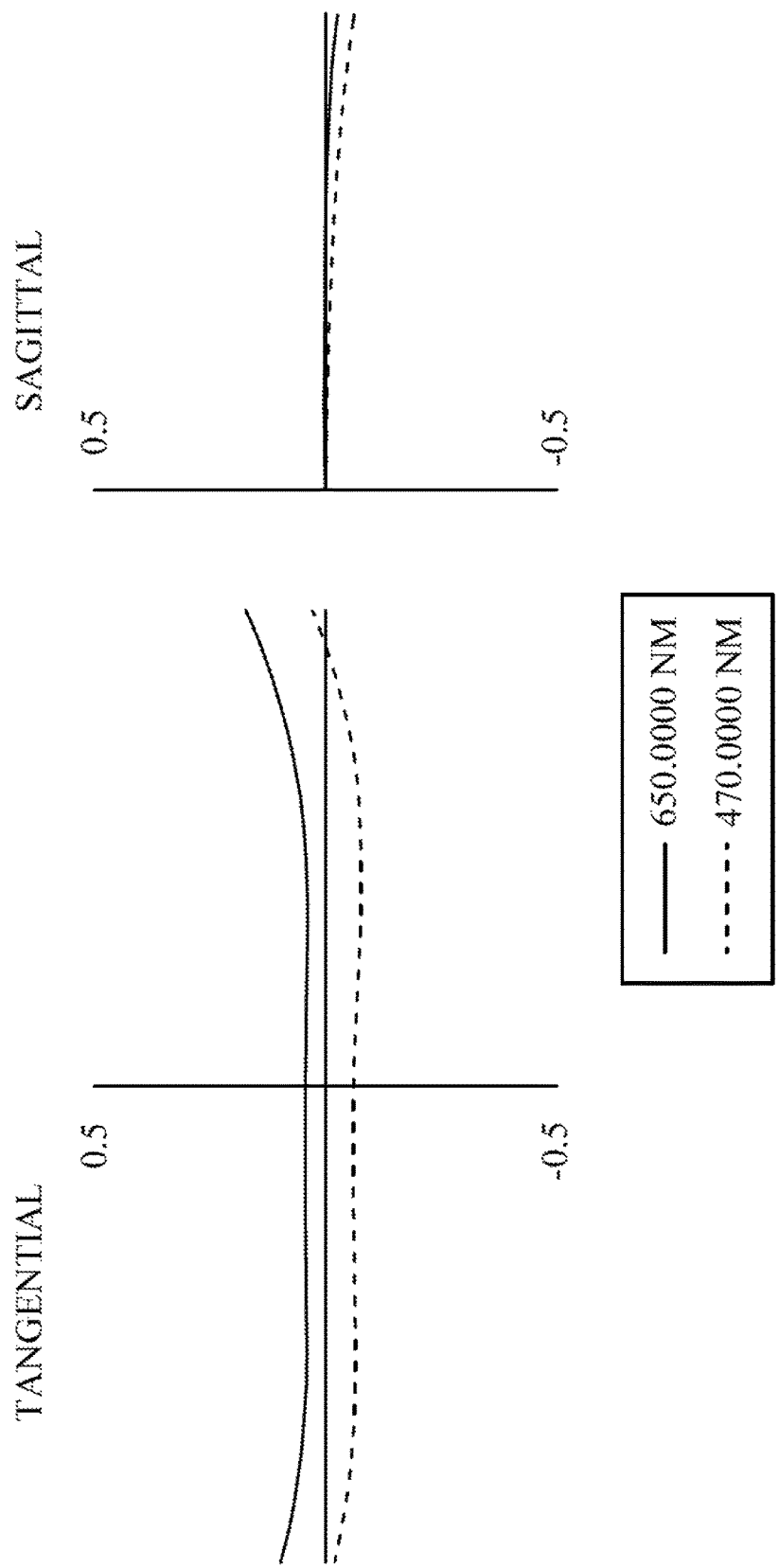
FIG. 5C is a lateral aberration diagram of tangential fan, sagittal fan, the longest operation wavelength and the shortest operation wavelength passing through an edge of the entrance pupil and incident on the image plane by 0.7 HOI according to the fifth embodiment of the present application.

Please refer to FIG. 5A, FIG. 5B and FIG. 5C, FIG. 5A is a schematic view of the optical image capturing system according to the fifth embodiment of the present application, FIG. 5B is longitudinal spherical aberration curves, astigmatic field curves, and an optical distortion curve of the optical image capturing system in the order from left to right according to the fifth embodiment of the present application, and FIG. 5C is a lateral aberration diagram of tangential fan, sagittal fan, the longest operation wavelength and the shortest operation wavelength passing through an edge of the entrance pupil and incident on the image plane by 0.7 HOI according to the fifth embodiment of the present application. As shown in FIG. 5A, in order from an object side to an image side, the optical image capturing system includes an aperture stop 500, a first lens element 510, a second lens element 520, an image plane 580, and an image sensing device 590. The object-side surface of the present embodiment, which is applied to the display designed with Full-HD or WQHD resolution such as HD 1080p display, is served as the purpose of the virtual reality. The imaging system of the present embodiment is designed with the resolution of 10.6 pixel/degree or 5.6 arcmin/pixel.

The first lens element 510 has positive refractive power and it is made of plastic material. The first lens element 510 has a convex object-side surface 512 and a convex image-side surface 514, and both of the object-side surface 512 and the image-side surface 514 are aspheric. The image-side surface 514 has three inflection points.

The second lens element 520 has positive refractive power and it is made of plastic material. The second lens element 520 has a convex object-side surface 522 and a concave image-side surface 524, and both of the object-side surface 522 and the image-side surface 524 are aspheric and have an inflection point.

Please refer to the following Table 9 and Table 10.

The detailed data of the optical image capturing system of the fifth embodiment is as shown in Table 9.

TABLE 9

Data of the optical image capturing system
f = 28.7409 mm; f/HEP = 7.1852; HAF (tan) = 49.9865 deg

| Surface # | | Curvature Radius | Thickness | Material | Index | Abbe # | Focal length |
|---|---|---|---|---|---|---|---|
| 0 | Object | Plano | At infinity | | | | |
| 1 | Ape. stop | Plano | 8.627 | | | | |
| 2 | Lens 1 | 414.8192733 | 9.831 | Plastic | 1.491 | 57.21 | 45.3591 |
| 3 | | −23.42912844 | 0.184 | | | | |
| 4 | Lens 2 | 9.706200278 | 4.407 | Plastic | 1.585 | 29.90 | 110.341 |
| 5 | | 9.492285042 | 21.952 | | | | |
| 6 | | | Plano | 0.000 | BK7_SCHOTT | 1.517 | 64.13 |
| 7 | | | Plano | 0.000 | | | |
| 8 | Image plane | | Plano | 8.627 | | | |

Reference wavelength (d-line) = 555 nm shield position: The clear aperture of the second surface is 13.40 mm.

As for the parameters of the aspheric surfaces of the fifth embodiment, reference is made to Table 10.

TABLE 10

Aspheric Coefficients

| Surface # | 2 | 3 | 4 | 5 |
|---|---|---|---|---|
| k = | 9.000000E+02 | −1.589647E+00 | −2.104855E+00 | −1.452936E+00 |
| A4 = | 9.565924E−05 | −9.479683E−05 | −5.710812E−05 | 2.751574E−05 |
| A6 = | −5.482868E−06 | −6.562360E−06 | 5.008519E−07 | −2.634984E−07 |
| A8 = | 1.868123E−07 | 2.320071E−07 | 3.227850E−09 | 1.099000E−11 |
| A10 = | −3.010060E−09 | −4.029440E−09 | −8.814000E−11 | 1.700000E−12 |
| A12 = | 2.711000E−11 | 4.393000E−11 | 6.700000E−13 | 0.000000E+00 |
| A14 = | −1.400000E−13 | −3.000000E−13 | 0.000000E+00 | 0.000000E+00 |
| A16 = | 0.000000E+00 | 0.000000E+00 | 0.000000E+00 | 0.000000E+00 |
| A18 = | 0.000000E+00 | 0.000000E+00 | 0.000000E+00 | 0.000000E+00 |
| A20 = | 0.000000E+00 | 0.000000E+00 | 0.000000E+00 | 0.000000E+00 |

The presentation of the aspheric surface formula in the fifth embodiment is similar to that in the first embodiment. Besides the definitions of parameters in following tables are equal to those in the first embodiment so the repetitious details will not be given here.

The following contents may be deduced from Table 9 and Table 10.

| Fifth embodiment (Primary reference wavelength: 555 nm) | | | | | |
|---|---|---|---|---|---|
| InRS11 | InRS12 | InRS21 | InRS22 | InRSO | InRSI |
| 2.0261 | −4.5526 | 6.1013 | 9.8378 | 8.1274 | 14.3904 |
| Σ \|InRS\| | \|InRS11\|/TP1 | \|InRS12\|/TP1 | \|InRS21\|/TP2 | \|InRS22\|/TP2 | TP1/TP2 |
| 22.5178 | 0.2061 | 0.4631 | 1.3845 | 2.2324 | 2.2308 |
| \|f/f1\| | \|f/f2\| | \|f1/f2\| | IN12/f | HOS/f | HOI |
| 0.6336 | 0.2605 | 0.4111 | 0.0064 | 1.2656 | 30.6000 |
| HVT11 | HVT12 | HVT21 | HVT22 | HVT22/HOI | HVT22/HOS |
| 0.0000 | 13.6491 | 15.5498 | 19.8996 | 0.6503 | 0.5471 |
| HOS | InTL | HOS/HOI | InS/HOS | ODT % | TDT % |
| 36.3731 | 14.4211 | 1.1887 | 1.2372 | −10.7970 | 8.7110 |
| PSTA | PLTA | NSTA | NLTA | SSTA | SLTA |
| 0.028 mm | 0.186 mm | −0.023 mm | 0.105 mm | −0.067 mm | −0.028 mm |

The following contents may be deduced from Table 9 and Table 10.

| Related inflection point values of fifth embodiment (Primary reference wavelength: 555 nm) | | | | | | | |
|---|---|---|---|---|---|---|---|
| HIF121 | 8.9488 | HIF121/HOI | 0.2924 | SGI111 | −2.3949 | \|SGI121\|/(\|SGI121\| + TP1) | 0.1959 |
| HIF122 | 11.2071 | HIF122/HOI | 0.3662 | SGI121 | −3.5646 | \|SGI122\|/(\|SGI122\| + TP1) | 0.2661 |
| HIF123 | 12.0279 | HIF123/HOI | 0.3931 | SGI122 | −3.9714 | \|SGI123\|/(\|SGI123\| + TP1) | 0.2877 |
| HIF211 | 10.9565 | HIF211/HOI | 0.3581 | SGI221 | 4.6289 | \|SGI211\|/(\|SGI211\| + TP2) | 0.3201 |
| HIF221 | 10.9510 | HIF221/HOI | 0.3579 | SGI221 | 5.5510 | \|SGI221\|/(\|SGI221\| + TP2) | 0.3609 |

The numerical related to the length of outline curve is shown according to table 9 and table 10.

| Fifth embodiment (Reference wavelength = 555 nm) | | | | | | |
|---|---|---|---|---|---|---|
| ARE | 1/2 (HEP) | ARE value | ARE−1/2 (HEP) | 2 (ARE/HEP) % | TP | ARE/TP (%) |
| 11 | 2.000 | 2.000 | 0.000 | 100.00% | 9.831 | 20.34% |
| 12 | 2.000 | 2.003 | 0.003 | 100.13% | 9.831 | 20.37% |
| 21 | 2.000 | 2.014 | 0.014 | 100.68% | 4.407 | 45.69% |
| 22 | 2.000 | 2.015 | 0.015 | 100.73% | 4.407 | 45.71% |
| ARS | EHD | ARS value | ARS−EHD | (ARS/EHD) % | TP | ARS/TP (%) |
| 11 | 13.400 | 338.718 | 325.318 | 2527.75% | 9.831 | 3445.52% |
| 12 | 13.831 | 1439.468 | 1425.637 | 10407.57% | 9.831 | 14642.64% |
| 21 | 17.070 | 272.813 | 255.743 | 1598.22% | 4.407 | 6190.63% |
| 22 | 21.951 | 49.719 | 27.769 | 226.50% | 4.407 | 1128.23% |

The Sixth Embodiment (Embodiment 6)

Figure 6A:
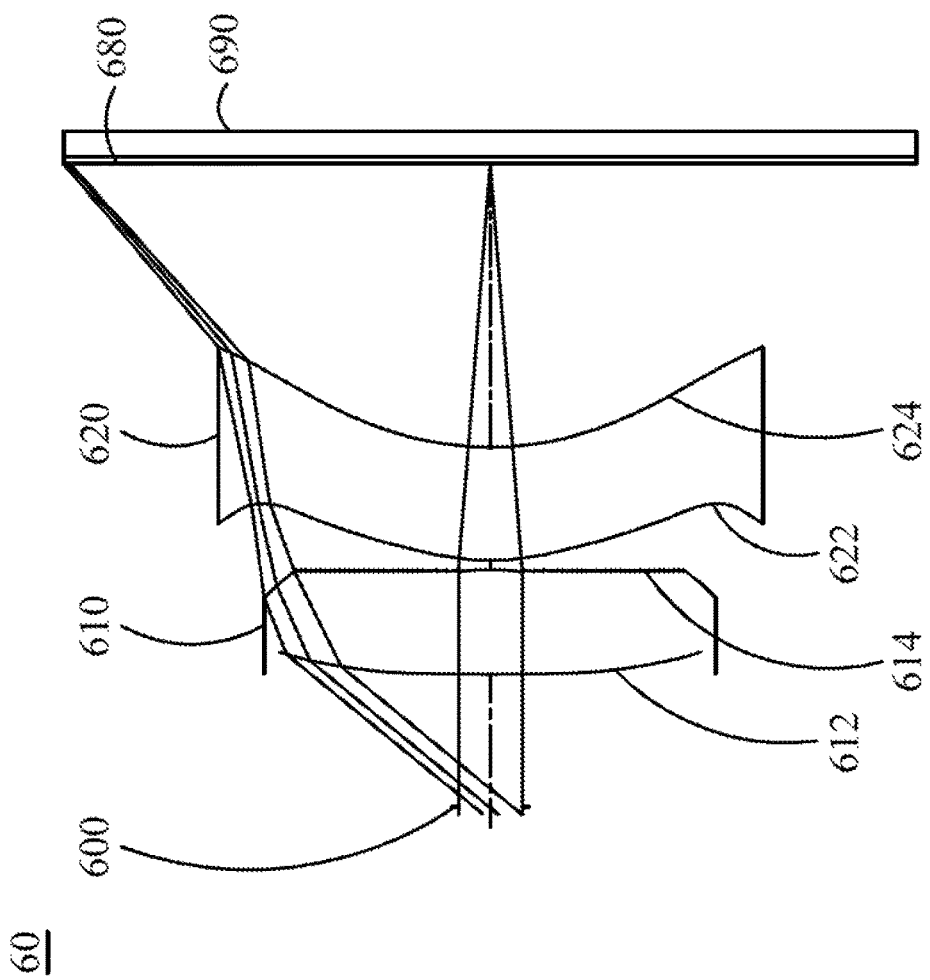
FIG. 6A is a schematic view of the optical image capturing system according to the sixth embodiment of the present application.
Figure 6B:
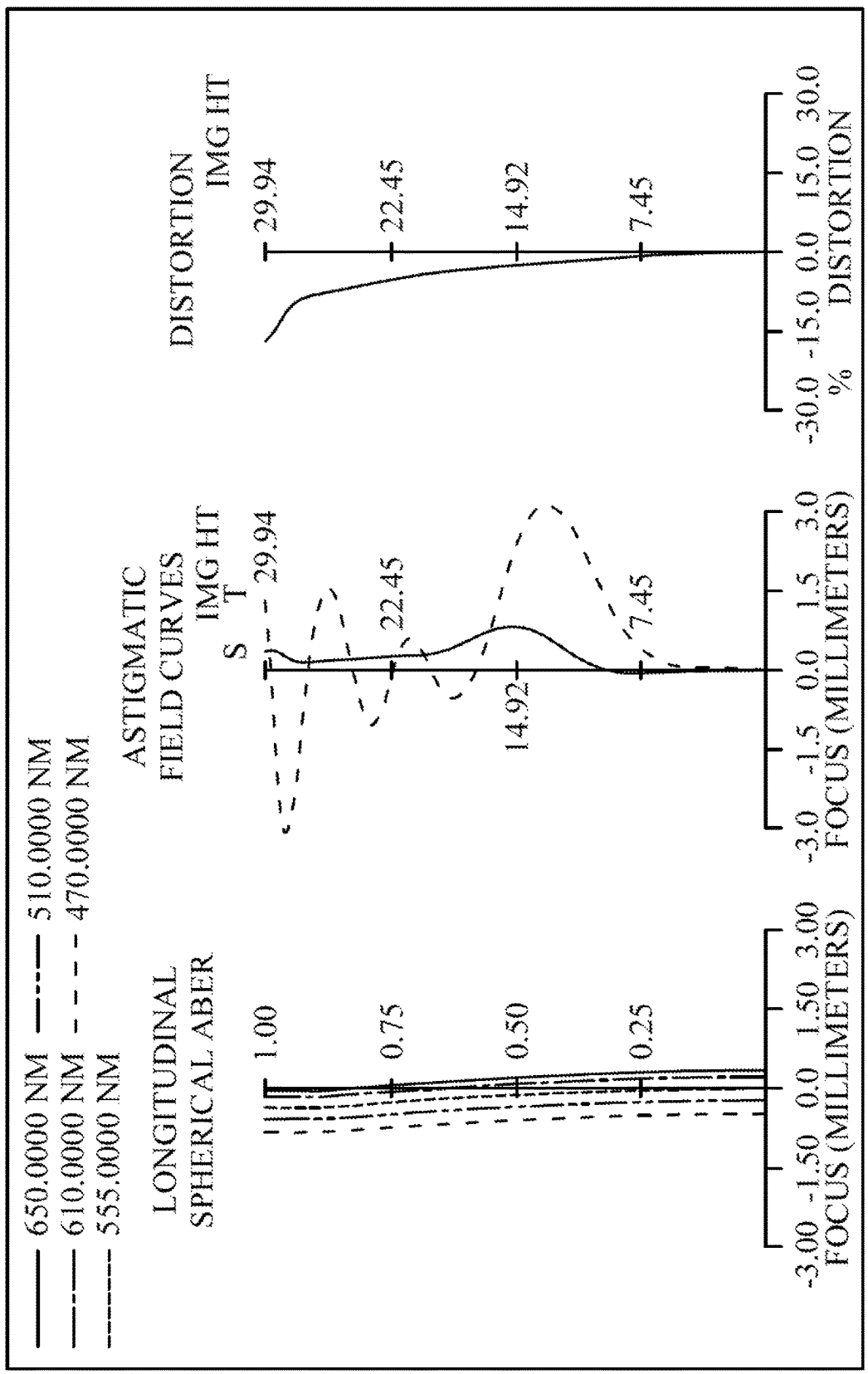
FIG. 6B is longitudinal spherical aberration curves, astigmatic field curves, and an optical distortion grid of the optical image capturing system in the order from left to right according to the sixth embodiment of the present application.
Figure 6C:
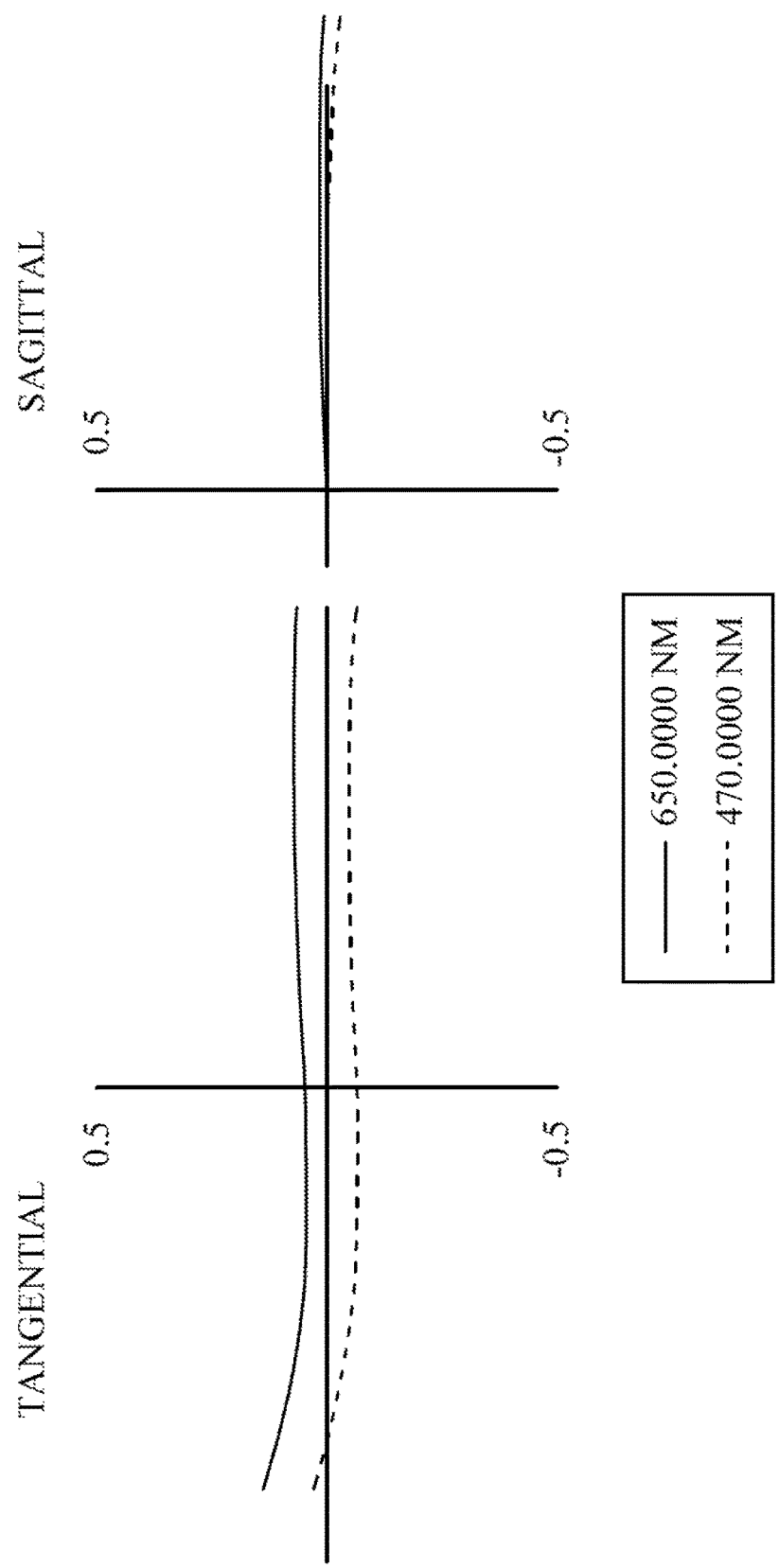
FIG. 6C is a lateral aberration diagram of tangential fan, sagittal fan, the longest operation wavelength and the shortest operation wavelength passing through an edge of the entrance pupil and incident on the image plane by 0.7 HOI according to the sixth embodiment of the present application.

Please refer to FIG. 6A, FIG. 6B and FIG. 6C, FIG. 6A is a schematic view of the optical image capturing system according to the sixth Embodiment of the present application, FIG. 6B is longitudinal spherical aberration curves, astigmatic field curves, and an optical distortion curve of the optical image capturing system in the order from left to right according to the sixth Embodiment of the present application, and FIG. 6C is a lateral aberration diagram of tangential fan, sagittal fan, the longest operation wavelength and the shortest operation wavelength passing through an edge of the entrance pupil and incident on the image plane by 0.7 HOI according to the sixth embodiment of the present application. As shown in FIG. 6A, in order from an object side to an image side, the optical image capturing system includes an aperture stop 600, a first lens element 610, a second lens element 620, an image plane 680, and an image sensing device 690. The object-side surface of the present embodiment, which is applied to the display designed with Full-HD or WQHD resolution such as HD 1080p display, is served as the purpose of the virtual reality. The imaging system of the present embodiment is designed with the resolution of 10.6 pixel/degree or 5.6 arcmin/pixel.

The first lens element 610 has positive refractive power and it is made of plastic material. The first lens element 610 has a convex object-side surface 612 and a convex image-side surface 614, and both of the object-side surface 612 and the image-side surface 614 are aspheric. The image-side surface 614 has two inflection points. The image-side surface 614 is a Fresnel lens consisted of 30 Discrete Zones.

The second lens element 620 has positive refractive power and it is made of plastic material. The second lens element 620 has a convex object-side surface 622 and a concave image-side surface 624, and both of the object-side surface 622 and the image-side surface 624 are aspheric and have an inflection point.

Please refer to the following Table 11 and Table 12.

The detailed data of the optical image capturing system of the sixth Embodiment is as shown in Table 11.

TABLE 11

Data of the optical image capturing system
f = 32.3062 mm; f/HEP = 7.6920; HAF (tan) = 49.96 deg

| Surface # | Curvature Radius | Thicknes | Material | Index | Abbe # | Focal length |
|---|---|---|---|---|---|---|
| 0 | Object | Plano | At infinity | | | |
| 1 | Shading sheet | Plano | 0.500 | | | |
| 2 | Ape. stop | Plano | 9.470 | | | |
| 3 | Lens 1 | 423.4078639 | 9.347 | Plastic | 1.491 | 57.21 | 42.5093 |
| 4 | | −21.86708632 | 0.409 | | | | |
| 5 | Lens 2 | 15.7648588 | 6.703 | Plastic | 1.585 | 29.90 | 285.482 |
| 6 | | 14.65671267 | 23.369 | | | | |
| 7 | | Plano | 0.000 | | | | |
| 8 | Image plane | Plano | 0.000 | | | | |

Reference wavelength (d-line) = 555 nm; shield position: The clear aperture of the first surface is 2.10 mm. The clear aperture of the third surface is 12.740 mm. The clear aperture of the fourth surface is 14.540 mm.

As for the parameters of the aspheric surfaces of the sixth Embodiment, reference is made to Table 12.

TABLE 12

Aspheric Coefficients

| Surface # | 3 | 4 | 5 | 6 |
|---|---|---|---|---|
| k = | 9.000000E+02 | −7.106888E−02 | −2.291902E+00 | −1.656089E+00 |
| A4 = | 8.040855E−05 | −1.596282E−04 | −1.049952E−04 | 7.257268E−05 |
| A6 = | −5.500679E−06 | 1.279398E−06 | 2.107174E−06 | −1.343912E−06 |
| A8 = | 1.868574E−07 | 2.331230E−09 | −5.390666E−08 | 1.536536E−08 |
| A10 = | −3.009760E−09 | −5.494800E−10 | 9.339600E−10 | −1.244000E−10 |
| A12 = | 2.711000E−11 | 1.354000E−11 | −9.390000E−12 | 6.300000E−13 |
| A14 = | −1.400000E−13 | −1.500000E−13 | 6.000000E−14 | 0.000000E+00 |
| A16 = | 0.000000E+00 | 0.000000E+00 | 0.000000E+00 | 0.000000E+00 |
| A18 = | 0.000000E+00 | 0.000000E+00 | 0.000000E+00 | 0.000000E+00 |
| A20 = | 0.000000E+00 | 0.000000E+00 | 0.000000E+00 | 0.000000E+00 |

In the sixth Embodiment, the presentation of the aspheric surface formula is similar to that in the first embodiment. Besides, the definitions of parameters in following tables are equal to those in the first embodiment, so the repetitious details will not be given here.

The following contents may be deduced from Table 11 and Table 12.

Sixth Embodiment (Primary reference wavelength: 555 nm)

| InRS11 | InRS12 | InRS21 | InRS22 | InRSO | InRSI |
|---|---|---|---|---|---|
| 0.8445 | −4.8195 | 3.8953 | 6.6968 | 4.7398 | 11.5163 |

| Σ |InRS| | |InRS11|/TP1 | |InRS12|/TP1 | |InRS21|/TP2 | |InRS22|/TP2 | TP1/TP2 |
|---|---|---|---|---|---|
| 16.2561 | 0.0903 | 0.5156 | 0.5811 | 0.9991 | 1.3945 |

| |f/f1| | |f/f2| | |f1/f2| | IN12/f | HOS/f | HOI |
|---|---|---|---|---|---|
| 0.7600 | 0.1132 | 0.1489 | 0.0127 | 1.2328 | 30.6000 |

| HVT11 | HVT12 | HVT21 | HVT22 | HOI | HOS |
|---|---|---|---|---|---|
| 0.0000 | 0.0000 | 14.5520 | 0.0000 | 0.0000 | 0.0000 |

| HOS | InTL | HOS/HOI | InS/HOS | ODT % | TDT % |
|---|---|---|---|---|---|
| 39.8281 | 16.4591 | 1.3016 | 1.2378 | −6.8473 | 5.7012 |

| PSTA | PLTA | NSTA | NLTA | SSTA | SLTA |
|---|---|---|---|---|---|
| −0.069 mm | 0.067 mm | 0.030 mm | 0.145 mm | −0.030 mm | 0.006 mm |

The following contents may be deduced from Table 11 and Table 12.

| Related inflection point values of sixth embodiment (Primary reference wavelength: 555 nm) | | | | | | | |
|---|---|---|---|---|---|---|---|
| HIF121 | 9.1907 | HIF121/HOI | 0.3003 | SGI111 | −2.5494 | \|SGI121\|/(\|SGI121\| + TP1) | 0.2143 |
| HIF122 | 10.3252 | HIF122/HOI | 0.3374 | SGI121 | −3.1710 | \|SGI122\|/(\|SGI122\| + TP1) | 0.2533 |
| HIF211 | 10.8872 | HIF211/HOI | 0.3558 | SGI221 | 2.7901 | \|SGI211\|/(\|SGI211\| + TP2) | 0.2299 |
| HIF221 | 11.0916 | HIF221/HOI | 0.3625 | SGI221 | 3.9875 | \|SGI221\|/(\|SGI221\| + TP2) | 0.2990 |

The numerical related to the length of outline curve is shown according to table 11 and table 12.

| Sixth embodiment (Reference wavelength = 555 nm) | | | | | | |
|---|---|---|---|---|---|---|
| ARE | 1/2 (HEP) | ARE value | ARE- 1/2 (HEP) | 2 (ARE/ HEP) % | TP | ARE/ TP (%) |
| 11 | 2.100 | 2.100 | 0.000 | 100.00% | 9.347 | 22.47% |
| 12 | 2.100 | 2.103 | 0.003 | 100.17% | 9.347 | 22.50% |
| 21 | 2.100 | 2.106 | 0.006 | 100.28% | 6.703 | 31.42% |
| 22 | 2.100 | 2.107 | 0.007 | 100.35% | 6.703 | 31.44% |
| ARS | EHD | ARS value | ARS- EHD | (ARS/ EHD) % | TP | ARS/ TP (%) |
| 11 | 11.451 | 36.869 | 25.418 | 321.96% | 9.347 | 394.44% |
| 12 | 12.847 | 301.764 | 288.917 | 2348.84% | 9.347 | 3228.44% |
| 21 | 14.727 | 734.832 | 720.106 | 4989.82% | 6.703 | 10962.69% |
| 22 | 16.153 | 116.294 | 100.141 | 719.96% | 6.703 | 1734.95% |

The above-mentioned descriptions represent merely the exemplary embodiment of the present disclosure, without any intention to limit the scope of the present disclosure thereto. Various equivalent changes, alternations or modifications based on the claims of present disclosure are all consequently viewed as being embraced by the scope of the present disclosure.

What is claimed is:

1. An optical image capturing system, from an object side to an image side, comprising: a first lens element with refractive power;
a second lens element with refractive power; and an image plane;
wherein the optical image capturing system consists of two lens elements with refractive power,
at least one of the two lens elements has positive refractive power, focal lengths of the two lens elements are f1 and f2, a focal length of the optical image capturing system is f, an entrance pupil diameter of the optical image capturing system is HEP, a distance on an optical axis from an object-side surface of the first lens element to the image plane is HOS, a distance from the object-side surface of the first lens element to the image-side surface of the second lens element on an optical axis is InTL, a length of outline curve from an axial point on any surface of any one of the two lens elements to a coordinate point of vertical height with a distance of a half of the entrance pupil diameter from the optical axis on the surface along an outline of the surface is denoted as ARE; the following relations are satisfied: $1.2 \leq f/HEP \leq 10.0$, $0.5 \leq HOS/f \leq 3.0$, $0 < InTL/HOS < 0.9$, and $1 \leq 2(ARE/HEP) \leq 1.5$.

2. The optical image capturing system of claim 1, wherein TV distortion for image formation in the optical image capturing system is TDT, a half of a diagonal of an effective detection field of the image sensing device is denoted by HOI, a lateral aberration of the longest operation wavelength of a positive direction tangential fan of the optical image capturing system passing through an edge of the entrance pupil and incident on the image plane by 0.7 HOI is denoted as PLTA, and a lateral aberration of the shortest operation wavelength of the positive direction tangential fan of the optical image capturing system passing through the edge of the entrance pupil and incident on the image plane by 0.7 HOI is denoted as PSTA, a lateral aberration of the longest operation wavelength of a negative direction tangential fan of the optical image capturing system passing through the edge of the entrance pupil and incident on the image plane by 0.7 HOI is denoted as NLTA, a lateral aberration of the shortest operation wavelength of a negative direction tangential fan of the optical image capturing system passing through the edge of the entrance pupil and incident on the image plane by 0.7 HOI is denoted as NSTA, a lateral aberration of the longest operation wavelength of a sagittal fan of the optical image capturing system passing through the edge of the entrance pupil and incident on the image plane by 0.7 HOI is denoted as SLTA, a lateral aberration of the shortest operation wavelength of the sagittal fan of the optical image capturing system passing through the edge of the entrance pupil and incident on the image plane by 0.7 HOI is denoted as SSTA; the following relations are satisfied: $PLTA \leq 600$ μm; $PSTA \leq 600$ μm; $NLTA \leq 600$ μm; $NSTA \leq 600$ μm; $SLTA \leq 600$ μm; and $SSTA \leq 600$ μm; $|TDT| < 60\%$.

3. The optical image capturing system of claim 1, wherein a maximum effective half diameter position of any surface of any one of the two lens elements is denoted as EHD, and a length of outline curve from an axial point on any surface of any one of the two lens elements to the maximum effective half diameter position of the surface along the outline of the surface is denoted as ARS; the following relation is satisfied: $1 \leq ARS/EHD \leq 1.5$.

4. The optical image capturing system of claim 1, wherein the following relation is satisfied: $0 \text{ mm} < HOS \leq 50 \text{ mm}$.

5. The optical image capturing system of claim 1, wherein a half of a maximum view angle of the optical image capturing system is HAF, and the following relation is satisfied: $0 \text{ deg} < HAF \leq 70 \text{ deg}$.

6. The optical image capturing system of claim 1, wherein a length of outline curve from an axial point on the object-side surface of the second lens element to a coordinate point of vertical height with a distance of a half of the entrance pupil diameter from the optical axis on the surface along an outline of the surface is denoted as ARE21; a length of outline curve from an axial point on the image-side surface of the second lens element to the coordinate point of vertical height with the distance of a half of the entrance pupil diameter from the optical axis on the surface along the outline of the surface is denoted as ARE22, and a thickness of the second lens element on the optical axis is TP2; the following relations are satisfied: 0.5≤ARE21/TP2≤4000 and 0.5≤ARE22/TP2≤4000.

7. The optical image capturing system of claim 1, wherein a length of outline curve from an axial point on the object-side surface of the first lens element to a coordinate point of vertical height with a distance of a half of the entrance pupil diameter from the optical axis on the surface along an outline of the surface is denoted as ARE11; a length of outline curve from an axial point on the image-side surface of the first lens element to the coordinate point of vertical height with the distance of a half of the entrance pupil diameter from the optical axis on the surface along the outline of the surface is denoted as ARE12, and a thickness of the first lens element on the optical axis is TP1; the following relations are satisfied: 0.5≤ARE11/TP1≤400 and 0.5≤ARE12/TP1≤400.

8. The optical image capturing system of claim 1, wherein the second lens element has a positive refractive power.

9. The optical image capturing system of claim 1, further comprising an aperture stop, a distance from the aperture stop to the image plane on the optical axis is InS, and the following relation is satisfied: 0.5≤InS/HOS≤1.5.

10. An optical image capturing system, from an object side to an image side, comprising: a first lens element with positive refractive power;
a second lens element with refractive power; and an image plane;
wherein the optical image capturing system consists of two lens elements with refractive power, two lens elements respectively has at least one inflection point on at least one surface thereof, focal lengths of the two lens elements are f1 and f2, a focal length of the optical image capturing system is f, an entrance pupil diameter of the optical image capturing system is HEP, a distance on an optical axis from an object-side surface of the first lens element to the image plane is HOS, a distance from the object-side surface of the first lens element to the image-side surface of the second lens element on an optical axis is InTL, a length of outline curve from an axial point on any surface of any one of the two lens elements to a coordinate point of vertical height with a distance of a half of the entrance pupil diameter from the optical axis on the surface along an outline of the surface is denoted as ARE; the following relations are satisfied: 1.2≤f/HEP≤10.0, 0.5≤HOS/f≤3.0, 0<InTL/HOS<0.9, and 1≤2(ARE/HEP)≤1.5.

11. The optical image capturing system of claim 10, wherein a maximum effective half diameter position of any surface of any one of the two lens elements is denoted as EHD, and a length of outline curve from an axial point on any surface of any one of the two lens elements to the maximum effective half diameter position of the surface along the outline of the surface is denoted as ARS; the following relation is satisfied: 1≤ARS/EHD≤1.5.

12. The optical image capturing system of claim 10, wherein the second lens element has a positive refractive power.

13. The optical image capturing system of claim 10, wherein a height for image formation on the image plane perpendicular to the optical axis in the optical image capturing system is denoted by HOI, a lateral aberration of the longest operation wavelength of a positive direction tangential fan of the optical image capturing system passing through an edge of the entrance pupil and incident on the image plane by 0.7 HOI is denoted as PLTA, and a lateral aberration of the shortest operation wavelength of the positive direction tangential fan of the optical image capturing system passing through the edge of the entrance pupil and incident on the image plane by 0.7 HOI is denoted as PSTA, a lateral aberration of the longest operation wavelength of a negative direction tangential fan of the optical image capturing system passing through the edge of the entrance pupil and incident on the image plane by 0.7 HOI is denoted as NLTA, a lateral aberration of the shortest operation wavelength of a negative direction tangential fan of the optical image capturing system passing through the edge of the entrance pupil and incident on the image plane by 0.7 HOI is denoted as NSTA, a lateral aberration of the longest operation wavelength of a sagittal fan of the optical image capturing system passing through the edge of the entrance pupil and incident on the image plane by 0.7 HOI is denoted as SLTA, a lateral aberration of the shortest operation wavelength of the sagittal fan of the optical image capturing system passing through the edge of the entrance pupil and incident on the image plane by 0.7 HOI is denoted as SSTA; the following relations are satisfied: PLTA≤600 μm; PSTA≤600 μm; NLTA≤600 μm; NSTA≤600 μm; SLTA≤600 μm; and SSTA≤600 μm.

14. The optical image capturing system of claim 10, wherein an object-side surface and an image-side surface of the second lens element both have at least one inflection point.

15. The optical image capturing system of claim 10, wherein a distance between the first lens element and the second lens element on the optical axis is IN12, and the following relation is satisfied: 0<IN12/f≤0.25.

16. The optical image capturing system of claim 10, wherein the distance from the first lens element to the second lens element on the optical axis is IN12, a thickness of the first lens element and a thickness of the second lens element on the optical axis respectively are TP1 and TP2, and the following relation is satisfied: 1<(TP1+IN12)/TP2≤10.

17. The optical image capturing system of claim 10, wherein a thickness of the first lens element and a thickness of the second lens element on the optical axis respectively are TP1 and TP2, and the following relation is satisfied: 0.5≤TP1/TP2≤10.

18. The optical imaging capturing system of claim 10, wherein a sum of an absolute value of each distance in parallel with the optical axis from a maximum effective diameter position on an object-side surface of each of the two lens elements to an axial point on the object-side surface of each of the two lens elements is InRSO, a sum of an absolute value of each distance in parallel with the optical axis from a maximum effective diameter position on an image-side surface of each of the two lens elements is InRSI a sum of InRSO and InRSI id Σ|InRSI| and the following relations are satisfied: 0<Σ|InRSI|/InTL≤3.

19. The optical image capturing system of claim 18, wherein a distance in parallel with the optical axis from a maximum effective diameter position to an axial point on the object-side surface of the first lens element is InRS11, a distance in parallel with the optical axis from a maximum effective diameter position to an axial point on the image-side surface of the first lens element is InRS12, a distance in parallel with the optical axis from a maximum effective diameter position to an axial point on the object-side surface of the second lens element is InRS21, a distance in parallel with the optical axis from a maximum effective diameter position to an axial point on the image-side surface of the second lens element is InRS22, and the following relation is satisfied: $0<(|\text{InRS11}|+|\text{InRS12}|+|\text{InRS21}|+|\text{InRS22}|)/\text{HOS}\leq 2$.

20. An optical image capturing system, from an object side to an image side, comprising: a first lens element with positive refractive power;
  a second lens element with positive refractive power, and an object-side surface and an image-side surface of the second lens element both have at least one inflection point; and an image plane;
  wherein the optical image capturing system consists of two lens elements with refractive power, at least one surface of the first lens element has at least one inflection point, and an object-side surface and an image-side surface of the second lens element both are aspheric, focal lengths of the two lens elements are f1 and f2, a focal length of the optical image capturing system is f, an entrance pupil diameter of the optical image capturing system is HEP, a distance on an optical axis from an object-side surface of the first lens element to the image plane is HOS, a distance from the object-side surface of the first lens element to the image-side surface of the second lens element on an optical axis is InTL, a length of outline curve from an axial point on any surface of any one of the two lens elements to a coordinate point of vertical height with a distance of a half of the entrance pupil diameter from the optical axis on the surface along an outline of the surface is denoted as ARE; the following relations are satisfied: $1.2\leq f/\text{HEP}\leq 10.0$, $0.4\leq |\tan(\text{HAF})|\leq 1.5$, $0.5\leq \text{HOS}/f\leq 3.0$, $0<\text{InTL}/\text{HOS}<0.9$, and $1\leq 2(\text{ARE}/\text{HEP})\leq 1.5$.

21. The optical image capturing system of claim 20, wherein a maximum effective half diameter position of any surface of any one of the two lens elements is denoted as EHD, and a length of outline curve from an axial point on any surface of any one of the two lens elements to the maximum effective half diameter position of the surface along the outline of the surface is denoted as ARS; the following relation is satisfied: $1\leq \text{ARS}/\text{EHD}\leq 1.5$.

22. The optical image capturing system of claim 20, wherein the following relation is satisfied: $0\text{ mm}<\text{HOS}\leq 50\text{ mm}$.

23. The optical image capturing system of claim 20, wherein a length of outline curve from an axial point on the object-side surface of the second lens element to a coordinate point of vertical height with a distance of a half of the entrance pupil diameter from the optical axis on the surface along an outline of the surface is denoted as ARE21; a length of outline curve from an axial point on the image-side surface of the second lens element to the coordinate point of vertical height with the distance of a half of the entrance pupil diameter from the optical axis on the surface along the outline of the surface is denoted as ARE22, and a thickness of the second lens element on the optical axis is TP2; the following relations are satisfied: $0.5\leq \text{ARE21}/\text{TP2}\leq 4000$ and $0.5\leq \text{ARE22}/\text{TP2}\leq 4000$.

24. The optical image capturing system of claim 20, wherein a length of outline curve from an axial point on the object-side surface of the first lens element to a coordinate point of vertical height with a distance of a half of the entrance pupil diameter from the optical axis on the surface along an outline of the surface is denoted as ARE11; a length of outline curve from an axial point on the image-side surface of the first lens element to the coordinate point of vertical height with the distance of a half of the entrance pupil diameter from the optical axis on the surface along the outline of the surface is denoted as ARE12, and a thickness of the first lens element on the optical axis is TP1; the following relations are satisfied: $0.5\leq \text{ARE11}/\text{TP1}\leq 400$ and $0.5\leq \text{ARE12}/\text{TP1}\leq 400$.

25. The optical image capturing system of claim 20, wherein the optical image capturing system further comprise an aperture stop, an image sensing device and a driving module, the image sensing device is disposed on the image plane, a distance from the aperture stop to the image plane is InS, and the driving module couples with the two lens elements to displace the lens elements; the following relation is satisfied: $0.5\leq \text{InS}/\text{HOS}\leq 1.5$.

* * * * *